(12) United States Patent
Shen et al.

(10) Patent No.: US 9,990,728 B2
(45) Date of Patent: Jun. 5, 2018

(54) PLANAR REGION GUIDED 3D GEOMETRY ESTIMATION FROM A SINGLE IMAGE

(71) Applicant: ADOBE SYSTEMS INCORPORATED, San Jose, CA (US)

(72) Inventors: Xiaohui Shen, San Jose, CA (US); Scott Cohen, Sunnyvale, CA (US); Peng Wang, Los Angeles, CA (US); Bryan Russell, San Francisco, CA (US); Brian Price, San Jose, CA (US); Jonathan Eisenmann, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days. days.

(21) Appl. No.: 15/261,749

(22) Filed: Sep. 9, 2016

(65) Prior Publication Data

US 2018/0075602 A1 Mar. 15, 2018

(51) Int. Cl.
*G06T 7/00* (2017.01)

(52) U.S. Cl.
CPC .. *G06T 7/0051* (2013.01); *G06T 2207/20084* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,356,272 B1* | 3/2002 | Matsumoto | | G06T 15/04 345/582 |
| 6,516,099 B1* | 2/2003 | Davison | | G06T 7/33 345/419 |
| 6,847,371 B2* | 1/2005 | Matsumoto | | G06T 15/04 345/582 |
| 7,164,784 B2* | 1/2007 | Beardsley | | G06K 9/32 382/106 |
| 7,970,204 B2* | 6/2011 | Sawachi | | G06K 9/32 345/158 |
| 9,372,072 B2* | 6/2016 | Ito | | G01B 11/08 |

(Continued)

OTHER PUBLICATIONS

D. Eigen and R. Fergus. Predicting depth, surface normals and semantic labels with a common multi-scale convolutional architecture. In ICCV, pp. 2650-2658. IEEE, 2015.

(Continued)

*Primary Examiner* — Anand Bhatnagar
(74) *Attorney, Agent, or Firm* — Brake Hughes Bellermann LLP

(57) ABSTRACT

Techniques for planar region-guided estimates of 3D geometry of objects depicted in a single 2D image. The techniques estimate regions of an image that are part of planar regions (i.e., flat surfaces) and use those planar region estimates to estimate the 3D geometry of the objects in the image. The planar regions and resulting 3D geometry are estimated using only a single 2D image of the objects. Training data from images of other objects is used to train a CNN with a model that is then used to make planar region estimates using a single 2D image. The planar region estimates, in one example, are based on estimates of planarity (surface plane information) and estimates of edges (depth discontinuities and edges between surface planes) that are estimated using models trained using images of other scenes.

20 Claims, 17 Drawing Sheets

(56) References Cited

U.S. PATENT DOCUMENTS

| | | | |
|---|---|---|---|
| 9,676,330 B2* | 6/2017 | Takemae | B60R 1/00 |
| 9,784,652 B2* | 10/2017 | Zahniser | G06T 7/0012 |
| 2004/0022431 A1* | 2/2004 | Beardsley | G06K 9/32 |
| | | | 382/154 |
| 2016/0245731 A1* | 8/2016 | Zahniser | G06T 7/0012 |

OTHER PUBLICATIONS

D. Eigen, C. Puhrsch, and R. Fergus. Depth map prediction from a single image using a multi-scale deep network. In NIPS. 2014.

R. Guo and D. Hoiem. Support surface prediction in indoor scenes. In ICCV, pp. 2144-2151. IEEE Computer Society, 2013.

D. Hoiem, A. A. Efros, and M. Hebert. Recovering surface layout from an image. pp. 151-172, 2007.

S. Ikehata, H. Yang, and Y. Furukawa. Structured indoor modeling. In 2015 IEEE International Conference on Computer Vision, ICCV 2015, Santiago, Chile, Dec. 7-13, 2015, pp. 1323-1331. IEEE, 2015.

A. G. Schwing, S. Fidler, M. Pollefeys, and R. Urtasun. Box in the box: Joint 3d layout and object reasoning from single images. In ICCV, pp. 353-360. IEEE Computer Society, 2013.

N. Silberman, D. Hoiem, P. Kohli, and R. Fergus. Indoor segmentation and support inference from rgbd images. In ECCV (5), pp. 746-760, 2012.

F. Srajer, A. G. Schwing, M. Pollefeys, and T. Pajdla. Match box: Indoor image matching via box-like scene estimation. In 2nd International Conference on 3D Vision, 3DV 2014, Tokyo, Japan, Dec. 8-11, 2014, vol. 1, pp. 705-712. IEEE Computer Society, 2014.

J. Xiao and Y. Furukawa. Reconstructing the world's museums. In Proceedings of the 12th European Conference on Computer Vision, ECCV '12, 2012.

Long, et al., "Fully convolutional networks for semantic segmentation", The IEEE Conference on Computer Vision and Pattern Recognition (CVPR), 2015, pp. 3431-3440.

Chen, et al., "Semantic Image Segmentation With Deep Convolutional Nets and Fully Connected CRFs", International conference on Learning Representations, Apr. 9, 2015, 14 pages.

Xie, et al., "Holistically-nested edge detection", The IEEE International Conference on Computer Vision (ICCV), 2015, pp. 1395-1403.

* cited by examiner

PLANAR REGION GUIDED 3D GEOMETRY ESTIMATION FROM A SINGLE IMAGE

TECHNICAL FIELD

This disclosure relates generally to computer-implemented techniques and more particularly relates to improving the efficiency and effectiveness of computing techniques that analyze and edit images.

BACKGROUND

Photographs and other 2D images depict 3D objects. Computers estimate the 3D geometry of the 3D objects depicted in such 2D images to enable numerous image editing techniques. For example, existing 3D geometry detection techniques are used to analyze a 2D image and create estimates of 3D geometry information for each of the pixels of the image. Specifically, these existing techniques are used to determine estimates of depth (e.g., distance from a camera) of the pixels in the images. For example, in a 2D image that depicts a room with furniture, the pixels of the back wall of the room are given larger depth estimates than the pixels of a sofa in the middle of the room that is estimated to be is closer to the camera. When an object, such as a bicycle, is added to the 2D image at a particular depth and in a location that is between the back wall and the sofa so that the sofa should block a portion of the bike, the pixel depth information is used to determine that the pixels of the sofa will be displayed rather than that portion of the bike, but that the pixels of the other portion of bike will replace the corresponding pixels of the back wall in the 2D image, since the back wall is deeper than the bike.

Similarly, existing techniques are used to determine estimates of normals (e.g., an orientation or direction associated with a pixel) of the pixels of 2D images. For example, existing techniques represent small areas of a 2D image by a geometry of connected polygons associated with the pixels, and the normals of the pixels identify a direction that is orthogonal to the surface of the associated polygon. When an object is inserted into the 2D image, the orientation of the inserted object can be based on the normal of a pixel at the location where the object is inserted. For example, if a new object, such as a bottle, is inserted in the center of the top surface of a table in the 2D image, the orientation of the new object can be based on the normal of the pixel at that location so that the object will appear to rest flat on the table surface.

Generally, existing techniques estimate depths and normals of the pixels of a 2D image to facilitate various image editing functions. The estimates enable image editors to more realistically insert people, cars, bicycles, advertisements, and other objects into the 2D image consistently with the depths and shapes of existing objects in the image. The estimates of depth and normals also enable adding shadows, view point changes, relighting, and other 3D realistic edits to the 2D image. Techniques to estimate geometries in images can use multiple images of a scene such as those taken by special-purpose 3D cameras, but it is often desirable to estimate the 3D geometry when only a single image of the scene is available.

One technique for estimating 3D geometry in a single 2D image is to train deep convolutional neural networks (CNNs) using a significantly large amount of training data. The technique uses depth training data to learn a first neural network and uses normal training data to learn a second neural network. The technique then uses the first neural network on an image to predict a depth map (i.e., a depth value at each pixel in the image) for the image and uses the second neural network to predict a normal map (i.e., a normal value at each pixel of the image) for the image. The technique learns the neural networks by minimizing overall differences between predicted depth/normal results and known ground truth depth/normal maps. At each pixel, the technique checks the difference between the predicted value and the ground truth and attempts to minimize the sum of all of those differences.

While the predictions of these existing CNN techniques to estimate depths and normals from a single image are good overall, the results often include many drawbacks, such as irregularities with respect to estimating the depths and normals in planar regions, among others.

SUMMARY

Techniques of the invention provide planar-region-guided estimates of the 3D geometry of objects depicted in the image. The techniques estimate regions of an image that are part of planar regions (i.e., flat surfaces) and use those planar region estimates to better estimate the 3D geometry of the image. The techniques advantageously require only a single 2D image of the objects to estimate the planar regions and the resulting 3D geometry of the objects. Training data from images of other objects is used to train a model, which is then used to make planar region estimates. The planar region estimates, in one example, are based on estimates of planarity (surface plane information) and estimates of edges (depth discontinuities and edges between surface planes). These estimates of edges and of planarity are estimated using models trained on images of other objects, which advantageously allows creating accurate planar region estimates from a single 2D image. The planar region estimates are used to provide better 3D geometry estimates for planar surfaces in 2D images. In one example, the estimates of the planar regions in a 2D image provide a likelihood that two pixels within the 2D image are within the same planar region (i.e., within a common planar region). If there is a high likelihood that the two pixels are in a common planar region, the techniques estimate the 3D geometry accordingly. Specifically, techniques of the invention estimate similar normals of two pixels that are likely to be in the same planar region and estimates depths of pixels that are consistent with the pixels likely being in the same planar region as one another. Techniques of the invention consider many or all pairs of pixels in the image simultaneously and estimate a 3D geometry for the image to minimize planar region irregularities based on the likelihoods that the respective pixel pairs are within common planar regions.

One technique of the invention provides a method performed by a computing device to enhance an image with planar-region-guided estimates of 3D geometry of objects depicted in the image. This technique involves determining planarity and edge strength of the pixels of the image and uses the planarity and edge strength to determine whether pixels of the image are within common planar regions. The planarity and edge strength can be determined using only the image of the objects, without requiring additional images of the object. The technique then determines 3D geometry values (e.g., depths and normals) of pixels in the common planar regions based on a planar region constraint that requires a relationship between the 3D geometry values of pixels within common planar regions. For example, the technique can select normals of the pixels of the image based on the planar region constraint requiring similar normals of pixels in common planar regions. The technique then enhances the image by using the 3D geometry values of the pixels to provide the 3D geometry of the objects in the image. The 3D geometry information can be stored as part of the image, stored with the image, or stored separately from the image.

Another technique of the invention additionally or alternatively accounts for deviation from original estimates of depths and normals in estimating the image 3D geometry. For example, this can involve determining normals, depths, planarity, and edge strength of pixels of the image. The technique then improves the normals and depths for planar regions. To do so, the technique determines whether pixels of the image are within common planar regions based on the planarity and edge strength of the pixels. The technique then adjusts the normals and depths of the pixels by employing an objective function to minimize planar region irregularities. The objective function penalizes adjustments to the normals and depths based on amount of adjustment and penalizes deviations from a planar region constraint that requires a relationship between the normals or depths of pixels within common planar regions. Specifically, the technique attempts to minimize the changes made to the normal and depth estimates while also satisfying a planar region constraint, such as one requiring similar normals of pixels in common planar regions. The technique then enhances the image by using the normals and depths of the pixels to provide the 3D geometry of the objects in the image.

Another technique of the invention enhances an image based on estimating likelihoods that pixels are within common planar regions. The technique computes values representing likelihoods that pixels of the image are within common planar regions. The technique further determines 3D geometry values of pixels based on applying a planar region constraint that requires a relationship between the 3D geometry values of pixels within common planar regions. Applying the planar region constraint uses the values representing likelihoods that pixels of the image are within common planar regions. For example, the technique can require more similarity between the normals of pixels based on a greater likelihood that the pixels are within a common planar region. The image is then enhanced by using the 3D geometry values of the pixels to provide the 3D geometry of objects in the image.

These illustrative features are mentioned not to limit or define the disclosure, but to introduce exemplary features to aid understanding thereof. Additional techniques are discussed in the Detailed Description, and further description is provided there.

BRIEF DESCRIPTION OF THE FIGURES

These and other features, techniques, and advantages of the present disclosure are better understood when the following Detailed Description is read with reference to the accompanying drawings.

DETAILED DESCRIPTION

Introduction

Techniques of the invention use estimates of planarity (surface plane information) and estimates of edges (depth discontinuities and edges between surface planes) to minimize irregularities in 3D geometries estimated in planar regions of an image. Techniques of the invention use this additional information about planarity and edges to provide improved depth estimates and/or normal estimates of objects depicted in the image. For example, the information is used to adjust normal and depth estimates to be consistent with one another within planar regions, and at the same time also minimize the differences between the adjusted estimates and the original estimates. The adjusted depth and normal estimates thus still retain overall accuracy but are regularized (i.e., with reduced irregularities that are inconsistent with the pixels being within a common planar region).

Figure 1:
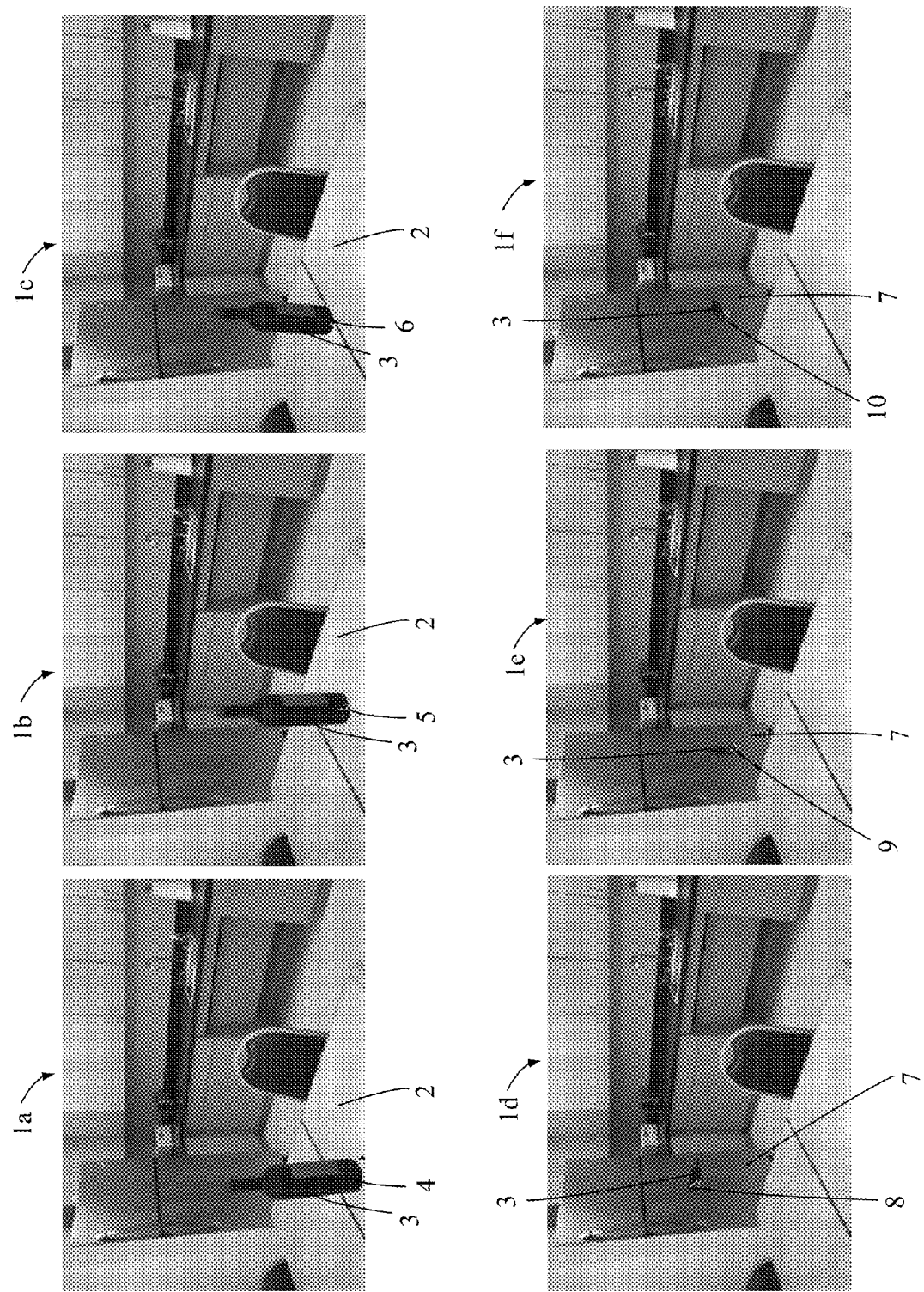
FIG. 1 is a block diagram illustrating how inserting an object into an image that has irregular 3D geometry in planar regions results in inconsistent orientation/tilting of the object.

As discussed above, while the single image estimates of existing CNN techniques for depths and normals are generally accurate overall, the estimates often include significant irregularities for planar regions. First, existing techniques fail to adequately regularize normals in planar regions. In particular, the estimated normals of pixels inside a given planar region of an image are often significantly different from other normal of pixels in the same planar region. This lack of regularity of estimated normals in planar regions inhibits subsequent editing of the image. For example, FIG. 1 is a block diagram illustrating how inserting an object into an image that has irregular 3D geometry in planar regions results in inconsistent orientation/tilting of the object. Versions of the image 1a-c illustrate a bottle 3 added on top of a planar table top 2. Because the 3D geometry estimated for the table top 2 includes significantly differing normals of different pixels, the orientations of the bottle 3 (which are based on the normals of pixels on the underlying surface upon which the bottle 3 rests) are significantly different in the three different locations 4, 5, 6. Similarly, versions of the image 1d-f illustrate the bottle 3 added on top of planar refrigerator front 7. Because the 3D geometry estimated for the refrigerator front 7 includes significantly different normals of different pixels, the orientations of the bottle 3 are significantly different in the different locations 8, 9, 10. FIG. 1 also illustrates that, for planar region pixels, conventional techniques also often fail to estimate normals that are perpendicular to the surfaces of planar regions.

Figure 2:
FIG. 2 is a block diagram illustrating how irregular depths interfere with object insertion.

Second, existing techniques fail to regularize depths sufficiently for many 3D editing functions. FIG. 2 is a block diagram illustrating how irregular depths interfere with object insertion. In FIG. 2, a rectangular wall-hanging picture 22 is inserted on a planar wall 21 in an image 20. Because the 3D geometry estimated for the planar wall 21 includes significantly differing depths of different pixels, portions of the inserted wall-hanging picture 22 are unintentionally obscured behind the wall 21 while other portions of the wall-hanging picture 22 are visible because the respective pixels are in-front of the wall. Because the wall 21 is not sufficiently regularized, the wall-hanging picture insertion does not work as it should.

Third, existing techniques fail to provide clear boundaries between different regions in the depth and normal maps. As a result, the transition between different surfaces exhibit undesirable and unexpected behaviors in image editing applications.

In contrast to existing techniques, techniques of the invention allow more accurate estimates of 3D geometries of objects depicted within an image. The techniques of the invention use a single 2D image of the objects to estimate whether pixels of the image are within common planar regions and use those estimates to better estimate the 3D geometry of the objects in the image. Whether pixels of the image are within common planar regions, in one example, is based on estimates of planarity and estimates of edges in the image. The estimates of planarity and estimates of edges are determined using models trained using images of other objects having known planes and edges. The techniques then determine 3D geometry values (e.g., depths and normals) of pixels in the common planar regions based on a planar region constraint that requires a relationship between the 3D geometry values of pixels within common planar regions. For example, the technique can select normals of the pixels of the image based on the planar region constraint requiring similar normals of pixels in common planar regions.

Techniques of the invention provide a 3D geometry of the image that identifies a depth estimate and a normal estimate for each pixel of the image. Techniques of the invention evaluate potential depth/normal combinations for all pixels of the image and select the best combination. For example, the techniques of the invention include selecting a combination that minimizes both irregularities in planar regions and deviation from original normal/depth estimates. Such selection can involve using an objective function that scores each potential combination and selects the one with the minimum score. The objective function is formulated so that the scores reflect how consistent the potential combinations of normal and depths of pixels are within common planar regions. When normal and/or depths of pixels within a common planar region are not consistent with the pixels being in a common planar region, a penalty is assigned that increases the score of that combination of depths and normals. Thus, a particular combination of normal estimates that has a lot of deviation between the normals of pixels within common planar regions will have a relatively high penalties assigned and a resulting high score.

To be able to assign such penalties to planar irregularities, techniques of the invention estimate whether two pixels are within the same planar region using the estimates of planarity and edges. In some techniques of the invention, a feature vector is used to identify characteristics of pixels that allow assessing the likelihood that one pixel is in the same planar region as another. The more similar one pixel's feature vector is to another pixel's feature, the more likely it is that the pixels are within the same planar region.

Some techniques of the invention select a combination of normals and depths of the pixels of an image by accounting for multi-channel information (e.g., estimates of depth, normal, planarity, and status from CNNs) in a unified fully-connected Conditional Random Fields (DenseCRF or DCRF) formulation. Compatibility functions for depths and normals are used in the DCRF formulation to leverage the planarity and edge strength information to ensure that the depths and normals are smooth or otherwise regular within planar regions and that their transitions are aligned with actual boundaries. The techniques can also ensure that the predicted depths and normals are consistent with each other within planar regions. In addition, the techniques can account for the confidence of the original estimates by penalizing a deviation from a confident original estimate more than a deviation from a less confident original estimate. Other techniques of the invention provide end-to-end training of the CNNs and DCRF, in which the errors are back propagated to the CNNs to improve the CNN models for the original depth and normal estimates.

Using planar region information to regularize pixel geometry estimation provides improved 3D geometry estimation of single images. Use of techniques of the invention can significantly improve the predicted depths and normals (e.g., depth maps and normal maps) provided by existing 3D geometry estimation techniques. Qualitatively, the results are generally cleaner with smooth or otherwise regular surface planes and clear boundaries and facilitate improved 3D object insertion.

Figure 3:
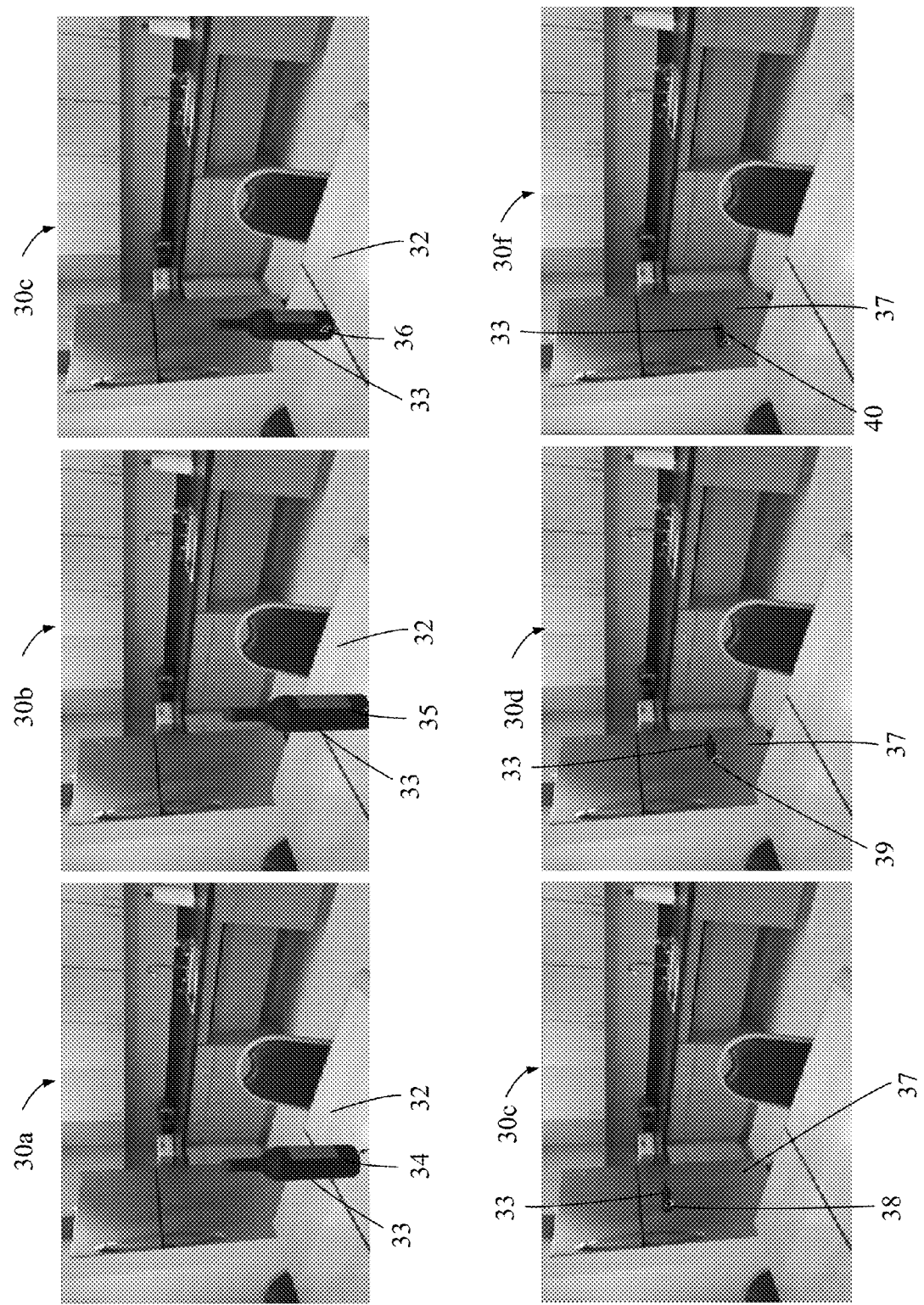
FIG. 3 is a block diagram illustrating how inserting an object into the image of FIG. 1 after reducing the planar region irregularity of the 3D geometry in planar regions results in more consistent orientation/tilting of the object.

FIG. 3 is a block diagram illustrating how inserting an object into the image of FIG. 1 after regularizing the 3D geometry in planar regions results in more consistent orientation/tilting of the object. Versions of the image 30a-c illustrate a bottle 33 added on top of a planar table top 32. Because the 3D geometry estimated for the table top 32 has been regularized, the orientations of the bottle 33 is more consistent in the three different locations 34, 35, 36 compared with the varying orientations illustrated by bottle 3 in FIGS. 1a-c. Similarly, versions of the image 30d-f illustrate the bottle 33 added on top of planar refrigerator front 37. Because the 3D geometry estimated for the refrigerator front 37 has been regularized, the orientations of the bottle 33 are more consistent in the three different locations 38, 39, 40 compared with the varying orientations illustrated by bottle 3 in 1d-f in FIG. 1. FIG. 3 also illustrates regularizing the 3D geometry for planar region pixels helps ensure that normals are perpendicular to the planar surfaces.

Figure 4:
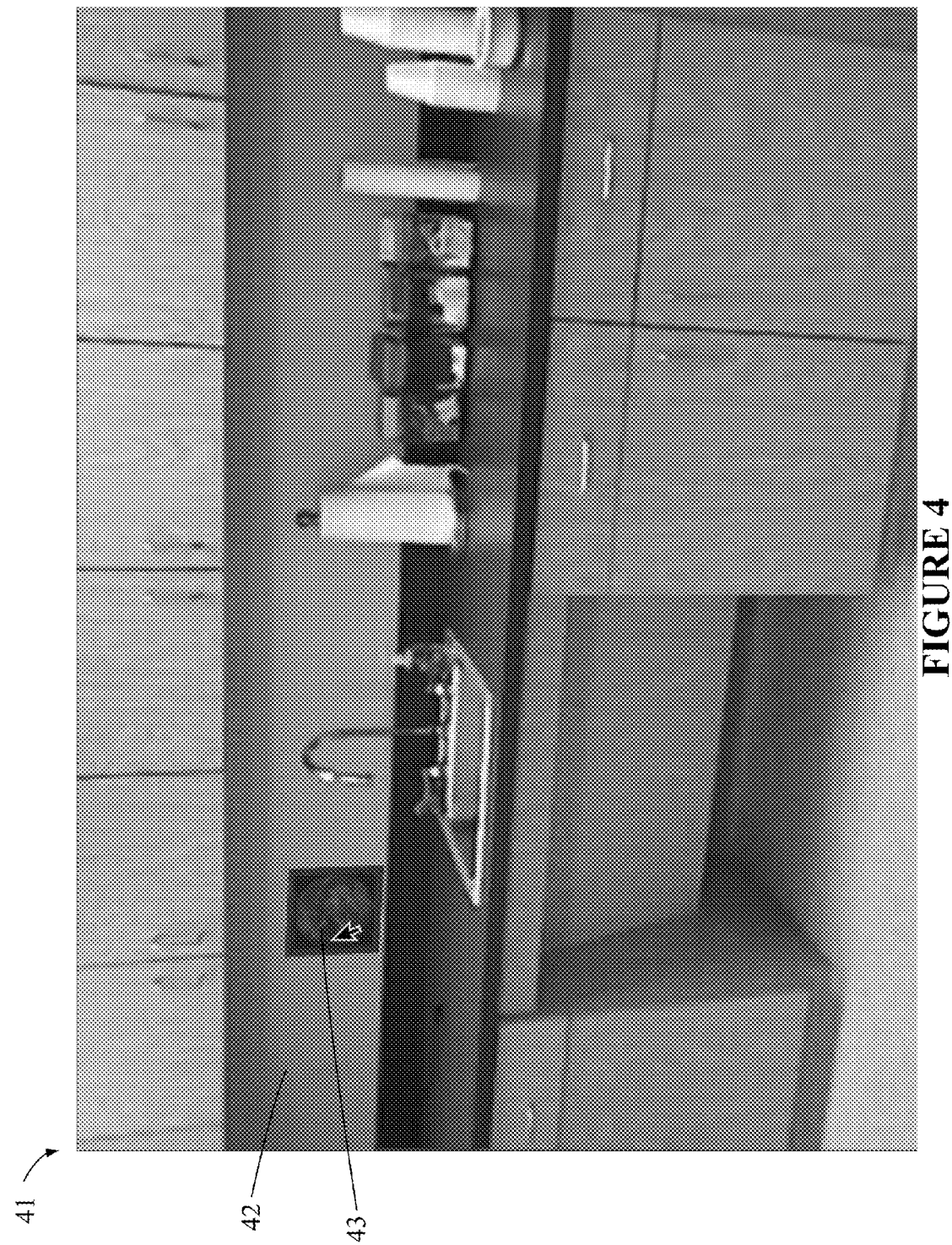
FIG. 4 is a block diagram illustrating how depths with reduced planar region irregularity facilitate object insertion.

FIG. 4 is a block diagram illustrating how regularized depths facilitate object insertion. In FIG. 4, a rectangular wall-hanging picture 43 is inserted on a planar wall 42 in an image 41 that is a regularized version of image 20 of FIG. 2. Because the 3D geometry estimated for the planar wall 21 has been regularized, the inserted wall-hanging picture 43 is generally visible in front of the wall 21.

This introduction presents certain features and advantages of some, but necessarily all techniques of the invention. Accordingly, additional techniques, features, and advantages of techniques of the invention are described in the additional description provided herein.

Terminology

As used herein, the phrase "image" refers to a digital, 2D depiction of persons, environment, and/or other 3D objects. The pixels (i.e., picture elements) of an image identify the appearance of particular portions of the image, for example, with each pixel identifying that a particular area of the image will have a particular color. Pixels are the smallest addressable element to be represented on a display of a computing device. Images are commonly captured using cameras or scanners and stored in memory on a computing device using information that simply defines the colors of the pixels for the image, without any additional information about the 3D geometry of the objects depicted by the image. Such images are enhanced by analyzing the images to estimate the 3D geometries of objects depicted. Examples of enhancing an image include, but are not limited to, storing information about the 3D geometries with the image or in a location accessible for use with the image.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "3D geometry" refers to one or more attributes that define or estimate the 3 dimensional (3D) location and/or orientation of an object or portion of an object in a 2 dimensional (2D) image. Examples of 3D geometry include, but are not limited to, estimates of normals and estimates of depths of the pixels of a 2D image.

As used herein, the phrase "3D geometry values" refers to values for one or more attributes of pixels that define or estimate the 3D location and/or orientation of the pixel in an object of portion of an object in a 2D image. Examples of 3D geometry values of pixels include, but are not limited to, normals and depths of the pixels.

As used herein, the phrase "depth" refers to how far a point on an object depicted by a pixel is from a camera or other reference position. A depth can be estimated by a computing device analyzing an image and the estimate can be compared with a ground truth (for example, as detected by a separate distance sensor on the camera that captured the image) to determine the accuracy of the depth. Depths of an image can be stored as a depth map that specifies depths of every pixel of the image. Depth maps are graphically depicted using different colors to represent different depths.

As used herein, the phrase "normal" refers to an orientation or direction associated with a pixel. In one example, small areas of an image are represented by a geometry of connected polygons associated with the pixels, and the normals of the pixels identify a direction that is orthogonal to the surface of the polygon associated with respective pixels. Pixels in a planar region (with no bumps or other texture) should have a normal that is orthogonal to the plane of the planar surface. Normals of an image can be stored as a normal map that specifies a normal of every pixel of the image. Normal maps are graphically depicted using different colors to represent different normals.

As used herein, the phrase "planarity" refers to information regarding whether a pixel is planar or not planar.

As used herein, the phrase "edge strength" refers to information regarding whether a pixel is at an edge between regions of an image. Edge strength is estimated based on discontinuity information about the image.

As used herein, the phrase "planar region" refers to an area of an image including pixels that are within a common plane as one another. Pixels within a common planar regions are within the same planar region as one another.

As used herein, the phrase "common planar region" refers to two or more pixels that are estimated to be within the same planar region in the 3D geometry of a 2D image. In one example, whether pixels of the image are within common planar regions is estimated by estimating planarity and edge strength of the pixels of the image. If two pixels are within a plane that is not separated by an edge, the pixels are considered to be within a common planar region in this example. In another example, a likelihood that two pixels are within a common planar region is estimated based on estimates of planarity and edge strength of the pixels of the image.

As used herein, the phrase "planar region irregularity" refers to depths and/or normals being inconsistent with being in a given plane. For example, pixels in planar regions should have the same normals as one another. The greater the difference in pixel normal within a planar region, the greater the planar region irregularity. As another example, pixels in a planar region should have a normal that is orthogonal to the plane of the planar surface. Thus, the depths of the pixels should define a plane that is orthogonal to the normals of the pixels. The greater the difference from that orthogonality, the greater the planar region irregularity.

As used herein, the phrase "planar region constraint" refers to any policy that requires a relationship between the 3D geometry values of pixels within common planar regions. One example of a planar region constraint is a policy that requires normals of pixels within common planar regions to have similar normals. Another example of a planar region constraint is a policy that requires that depths of pixels in common planar regions translate to pixel 3D positions consistent with planar expectations. For example, depth values of pixels can be used to determine x, y, z coordinates of pixels that define 3D positions of the pixels. The example planar region constraint requires that these 3D positions of the pixels within a planar region lie on or near a single plane.

As used herein, the phrase "regularizing" refers to reducing planar region irregularity in planar regions of an image. If original estimates of depths and normals are determined, then regularizing improves the smoothness or consistency with being on a plane of the depths and normals.

As used herein, the phrase "feature vector" refers to any n-dimensional vector of numerical features that represent an object. A feature vector, for example, can be created for each pixel of an image to illustrate how each pixel relates to other pixels of the image according to different criteria.

As used herein, the phrase "combinations of normals and depths of the pixels of the image" refers to a particular set of values of the normals and depths of the pixels of the image, e.g., a particular normal map and depth map combination.

Examples of Estimating the 3D Geometry of an Image

Figure 5:
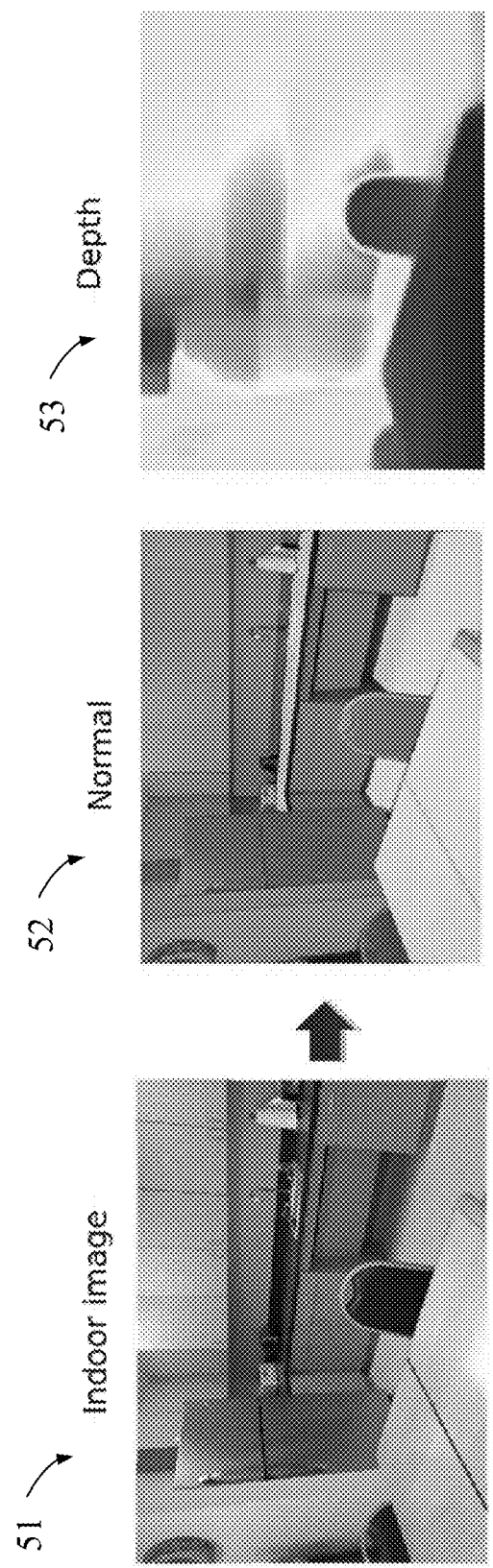
FIG. 5 illustrates depictions showing an image, a graphical depiction of normal map for the image, and a graphical depiction of a depth map for the image.

FIG. 5 is a block diagram illustrating an image 51, a graphical depiction of normal map 52 for the image, and a graphical depiction of a depth map 53 for the image 51. Techniques of the invention more accurately derive normals and depths such as those graphically depicted in FIG. 5 by identifying planar region irregularities. Some techniques of the invention use a computer-implemented algorithm that automatically estimates which regions of an image are planar regions and improves the estimates of depths and normal in those planar regions. The improvements can be based on original estimates based on, for example, neural networks that provide generally good results overall but that often have significant planar irregularities. The original results from such estimates providing accurate finer details are improved with regularized planar regions.

Figure 6:
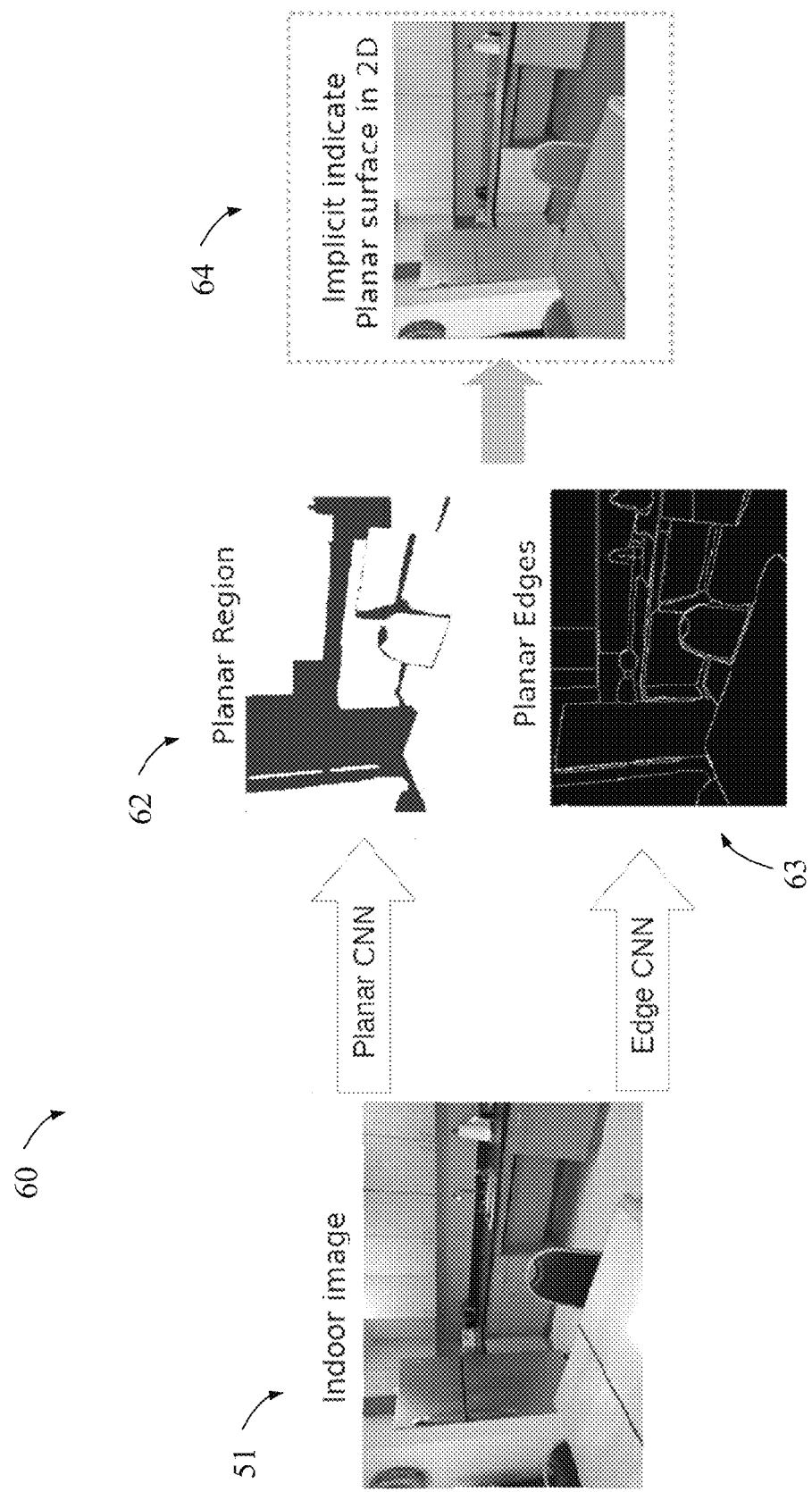
FIG. 6 is a flowchart illustrating an exemplary method for identifying planar regions in the image of FIG. 5.

FIG. 6 is a flowchart using graphical depictions to illustrate an exemplary method 60 for identifying planar regions in an image. The method 60 performs a planar CNN on the image 51 to estimate the planarity of the pixels of the image as shown in the graphical depiction of planarity 62. Similarly, the method 60 performs an edge CNN on the image 51 to estimate pixels of the image corresponding to planar edges as shown in the graphical depictions of edge strength 63. The method 60 then uses the estimated planarity and edge strength to identify planar surfaces as shown in planar surface depiction 64.

The graphical depiction of planarity 62 illustrates a plane map that, in some techniques of the invention, represents a pixel being in a plane with one value, e.g., "1," and a pixel not being in a plane with another value, e.g., "0". In the graphical depiction of planarity 62, pixels of the lighter color indicate planar and pixels of the darker color indicate non-planar, e.g., curved.

The graphical depiction of edge strength 63 are based on depth discontinuities in the image. These discontinuities identify edges (i.e., boundaries) between different planar regions and edges between planar and non-planar regions. While, in this example, two kinds of edges are identified in one output, alternative techniques could separate the different kinds of edges. The edge strength information is used to define the planarity information into defined planar regions. For example, the edge strength information can be used to identify that a grouping of planar pixels identified in the planarity estimate can be divided into multiple planar regions based on the edges within the grouping. As a more specific example, pixels of a table top may be adjacent to pixels of a floor surface and all of those table top and floor pixels will be identified respectively as being part of some plane in the planarity estimates. The edge strength information is used to distinguish pixels that belong to the planar region of the table top from the pixels that belong to the planar region of the floor.

Figure 7:
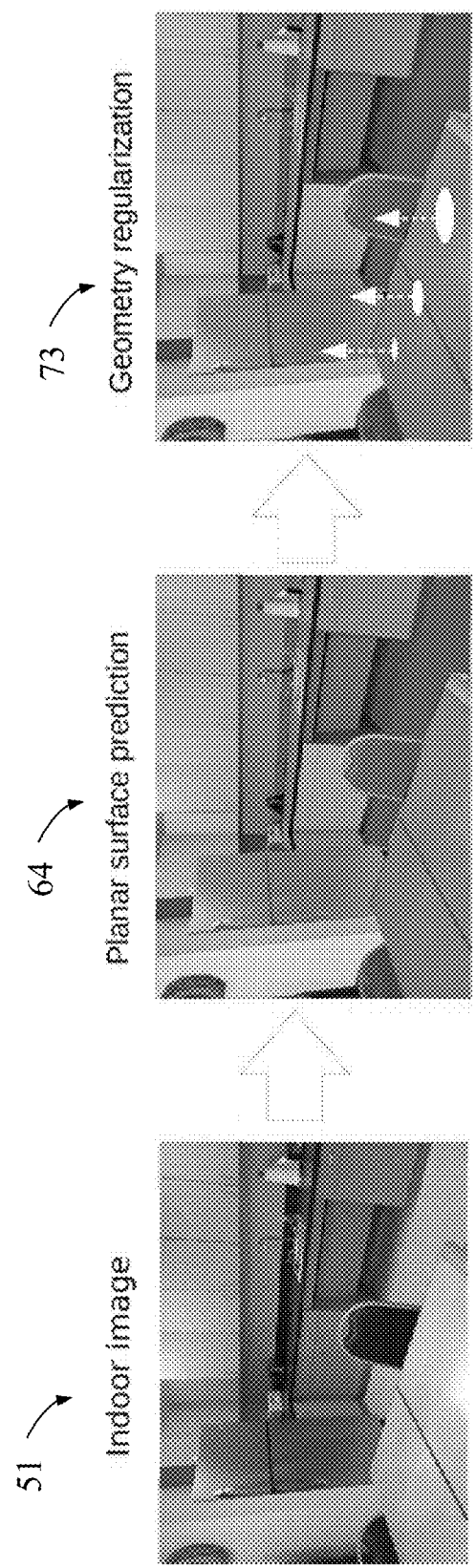
FIG. 7 is a block diagram illustrating using the planar regions identified in the method of FIG. 6 to provide geometry regularization.

FIG. 7 is a block diagram illustrating using the planar regions identified in the method 60 of FIG. 6 to provide geometry regularization. FIG. 7 illustrates the image 51, and the planar surface depiction 64 of the graphical surfaces identified for the image, and a regularized geometry 73. The identified graphical surfaces in the planar surface depiction correspond to pixels that are estimated to be within common planar regions. The planar surfaces are used to minimize planar region irregularities. Specifically, the graphical depiction of a regularized 3D geometry 73 for the image 51 depicts normals of pixels on a common planar region in the same direction. Estimates and normals and estimates of depths are determined for all of the pixels in the region. The normal and estimates are estimated using techniques of the invention that attempt to make the estimates for pixels within common planar regions in the planar surface depiction 64 consistent with the knowledge that those pixels are likely within common planar regions.

Some techniques of the invention, use estimates of depths, normal, planarity, and edge strength, and regularize the original estimates of depths and normals to better represent planar regions. More specifically, given estimates of planar regions as shown in planar surface depiction 64, adjusted values of depths and normal are determined to eliminate planar irregularities. This can involve making normals within planar regions more similar to one another than they were in the original normal estimates and/or making depths within a planar region more consistent with depths of pixels lying on a common plane.

Figure 8:
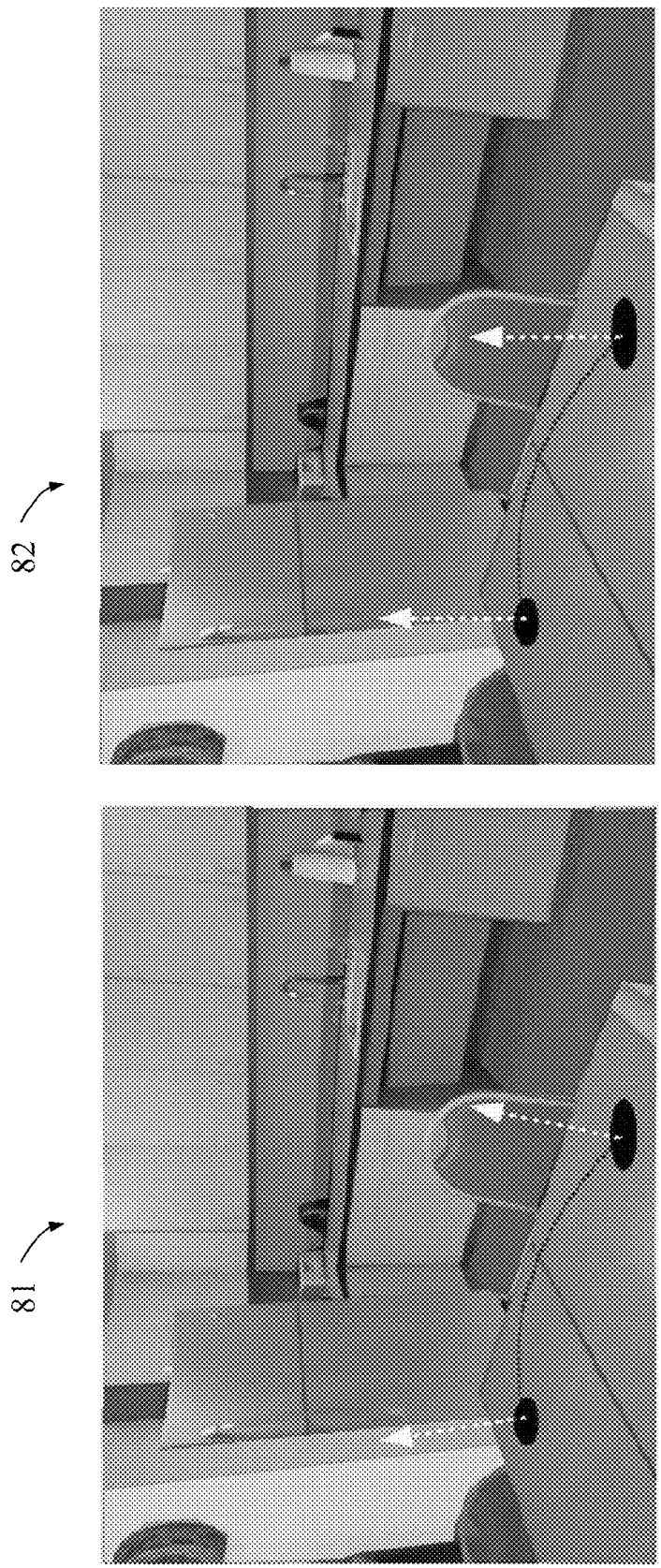
FIG. 8 is a block diagram illustrating a correction of a planar region irregularity.

For example, FIG. 8 is a block diagram illustrating a correction of a planar region irregularity that was present in original normal estimates. In depiction 81, the normals of pixels in a common planar region point in different directions in the original estimates of the 3D geometry of the image. The 3D geometry is regularized, as shown in depiction 82, so that the normals point in the same direction.

Examples of Using CNNs to Estimate 3D Geometry

Existing techniques use CNNs to estimate depths and normals. Some techniques of the invention use additional CNNs to additionally predict planarity and edges. For example, each of four neural networks can be used to predict a different quantity about each pixel, e.g., (1) a depth value (2) a 3D vector for normal (3) a bit that identifies planar or not planar and (4) a strength of an edge. The CNNs used to predict any of the four types of estimates can be learned using ground truths derived, for example, using depth capture scans of training image data.

Figure 9:
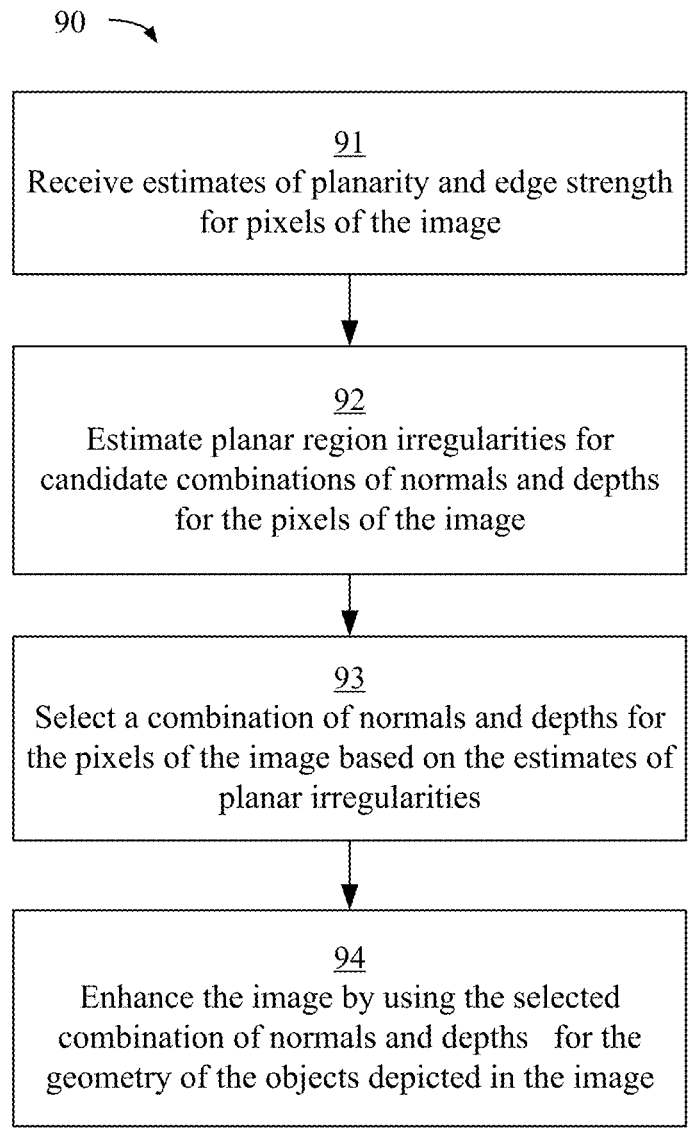
FIG. 9 is a flow chart illustrating an exemplary method for enhancing an image with planar region guided estimates of 3D geometry of objects depicted in the image.

FIG. 9 is a flow chart illustrating an exemplary method 90 for enhancing an image with planar region guided estimates of 3D geometry of objects depicted in the image. The method 90 can be implemented on a computing device such as computing device 160 of FIGS. 16 and 17.

Method 90 involves receiving estimates of planarity and edge strength of pixels of the image, as shown in block 91. In some techniques of method 90, original estimates of depths and normals are also received. In one example, deep convolutional neural networks (CNN) are trained using training data to estimate depths, normals, planarity, and edge strengths. The CNNs are applied to the image to identify the original estimates for normals and depths of the pixels and estimates of planarity and edge strength. These estimates are then used to determine planar regions of the image. The original estimates of normals and depths are then adjusted based on which pixels of the image are likely to be within common planar regions.

After receiving the estimates of planarity and edge strength, method 90 involves the estimating planar region irregularities for combinations of normals and depths of the pixels of the image, as shown in block 92. The planar region irregularities are identified by identifying inconsistent normals and depths of pixels within common planar regions.

Planar region irregularities are identified by quantifying differences between normals of pixels in common planar regions. For example, since normals of pixels in planar regions are expected to be the same as one another for the different pixels within the planar region, differences in normals can be minimized by selecting normals of the pixels in common planar regions that are similar to one another.

Pixel irregularities are also identified by assessing pixel positions based on pixel depths and quantifying differences between the pixel positons from planar expectations. For example, based on the orientation of a planar region, the pixels of the planar region can be expected to have particular 3D location coordinates. Thus, given the slope of the surface of a table, the pixels on the surface of the table can be expected to have particular relative locations. For example, if a camera captures an image of a table while pointed straight down at the table, all of the pixels of the table should have the same depth values. The orientation of the table relative to the camera, can be estimated based on the normals of the pixels of table. Thus, based on determining that the normals of the pixels of the table have a such an orientation, the depth estimates can be provided to provide consistent depth values for the table surface. If the table is tilted relative to the camera, an angle of the tilt can be estimated based on the normals of the pixels of the table, and appropriate pixel depths that are consistent with that tilt can be selected. For example, based on the tilt, the technique can determine that a first pixel should be a depth X, a next pixel should be at depth X+1, the next pixel should be at depth X+2, etc., where the amount added for each successive pixel is determined based on the table tilt. The table tilt can be estimated based on the normal of the table.

Pixel irregularities are also identified by assessing orthogonal compatibility of depths and normals. Assessing orthogonal compatibility of depths and normals is performed in some techniques of the invention by assigning 3D positions to a first pixel and a second pixel in a respective planar region. These 3D positions are assigned based on estimates of depths of the pixels. A vector connecting the 3D positons of the first pixel and the second pixel is identified. The technique uses this vector to assess how consistent the pixel depths used to identify the pixel positions are with normal estimates of the pixels. Specifically, the technique determines an actual relationship between the vector and a normal of the first pixel. Since the pixels are in a common planar region, the vector should ideally be perpendicular to the normal. Thus, the technique is able to estimate irregularity of the planar region (i.e., inconsistency between the depths and normal) based on the vector connecting two pixels of a planar region from perpendicular to the pixel normal estimates.

In estimating occurrences and significance of planar region irregularities, whether respective pixels are within a common planar region is assessed based on the estimates of planarity and edge strength. In one example, the computing device derives a feature vector for pixels of the image using the estimates of planarity and edge strength and then assesses whether respective pixels are within common planar regions by comparing feature vectors of the respective pixels. In some techniques, whether pixels are within a common planar region is assessed as a binary (e.g., "yes/no") determination. In other techniques, the computing device computes values representing likelihoods that the pixels are within common planar regions based on the planarity and edge strength information.

Some techniques assess combinations of normals and depths by optimizing an objective function that penalizes planar irregularities and/or deviations from original estimates of depths and normals. The objective function assigns penalties to allow comparison of combinations to one another. In one example, the penalties are assigned to penalize for deviating from the original estimates of depths and normals and penalized for planar region irregularities. The objective function can account for confidence of original estimates of depths and normals by assigning a relatively smaller penalty to deviations from less confident original estimates of depths and normals. Confidence, for example, can be obtained using the Monte Carlo Dropout process. The objective function can penalize planar region irregularities based on inconsistences between the respective pixels and using the likelihoods that the respective pixels are within common planar regions. The objective function can separately account for compared pixels being in a common plane as well as the distance between the compared pixels.

Method 90 further involves selecting a combination of normals and depths of the pixels of the image based on estimating of planar irregularities, as shown in block 93. For example, for each combination of estimates of normals and estimates of depths, the technique can quantify the amount of differences between normals within common planar regions and quantify the amount of inconsistency between depth values between pixels that are within common planar regions. This allows the technique to consider all possible combinations of estimates of normals and estimates of depths and select a combination in a quantitative way that minimizes irregularities. Thus, the technique selects a combination that provides relatively similar normal estimates within common planar regions and depth estimates for pixels in common planar regions that are relatively consistent with the pixels being within common planar regions. An objective function can be used to score the combinations and select the combination of normal and depths of the pixels assigned a lowest score.

Method 90 further involves enhancing the image by using the selected combination of normals and depths of the pixels of the image for the 3D geometry of the objects depicted in the image, as shown in block 94.

Examples Using a DCRF for Planar Region Regularized 3D Geometry Estimation

Some techniques of the invention use a dense conditional random field (DCRF) for planar region regularization. The details of the following example of using a DCRF can be modified to fit the requirements of the particular implementation. In this example, an input image is passed through a four-stream convolutional neural network (CNN) that predicts at each pixel a surface normal, depth value, and whether the pixel belongs to a planar surface or a 3D edge (i.e., depth discontinuity or convex/concave edge in 3D), along with their prediction confidences. In this example, the CNNs for the normals and depths produce high-fidelity outputs but do not explicitly enforce their predictions to agree with depicted planar regions. To address this, a fully connected DCRF that reasons over the CNN outputs is used to regularize the normals and depths. The DCRF jointly aligns the surface normals and depths to individual planar surfaces derived from the edge and planarity information, all while preserving fine detail within objects. This DCRF leverages the advantages of previous fully-connected CRF techniques in terms of both its non-local connectivity, which allows propagation of information across an entire planar surface, and efficiency during inference.

The example DCRF described below incorporates planarity and edge strength predictions for depth and normal regularization. Specifically, the field of variables optimized are depths, $D=\{d_i\}_{i=1}^{K}$, where K is number of the pixels, and normals, $N=\{n_i^o\}_{i=1}^{K}$, where $n_i=\{n_{ix}, n_{iy}, n_{ix}\}^T$ indicates the 3D normal direction. In addition, four types of information from the CNN estimates are used, namely a predicted normal map $N_o=\{n_i^o\}_{i=1}^{K}$, a depth map $D_o=\{d_i\}_{i=1}^{K}$, a plane probability map $P_o$ and edge predictions $E_o$. The problem is then formulated as, $$\min_{N,D} \Sigma_i \psi u(n_i,d_i|N_o,D_o) + \lambda \Sigma_{i,j,i \neq j} \psi_r(n_i,n_j,d_i,d_j|P_o,E_o)$$
$$\text{with } \|n_i\|_2 = 1 \quad (1)$$

where $\psi_u(\cdot)$ is a unary term encouraging the optimized surface normals $n_i$ and depths $d_i$ close to the output $n_i^o$ and $d_i^o$ from the networks. $\psi_r(\cdot, \cdot)$ is a pairwise fully connected regularization term depending on the information from the plane map $P_o$ and edge map $E_o$, encouraging consistency of normals and depths within planar regions with the underlying depicted 3D planar surfaces. The normal estimates are also constrained to have unit length. Specifically, the definition of unary and pairwise in this exemplary model are as follows.

Unary Terms.

The unary terms help ensure that revised estimates for the normals and depths do not deviate too significantly from the original estimates of the normal and depths. How much the new estimates are permitted to deviate from the original estimates can be based on measures of confidence in the original estimates. These measures of confidence are based on information from the original CNN estimations. In these original CNN estimations, when forward propagating multiple times with dropout, the CNN predictions have different variations across different pixels, indicating the estimation uncertainty. Based on the estimation variance from the normal and depth networks, pixel-wise confidence values $w_i^n$ and $w_i^d$ are obtained for normal and depth predictions. This information is leveraged to DCRF inference by trusting the estimates with higher confidence while regularizing more over ones with low confidence. By integrating the confidence values, the unary term is defined as, $$\psi_u(n_i, d_i | N_o, D_o) = \frac{1}{2} \omega_i^n \psi_n(n_i | n_o) + \frac{1}{2} \omega_i^d \psi_d(d_i | d_o), \quad (2)$$

where $\psi_n(n_i|n_o) = 1 - n_i \cdot n_i^o$ is the cosine distance between the input and output surface normals, and $\psi_d(d_i|d_o) = (d_i - d_i^o)^2$ is the is the squared difference between input and output depth.

Figure 10:
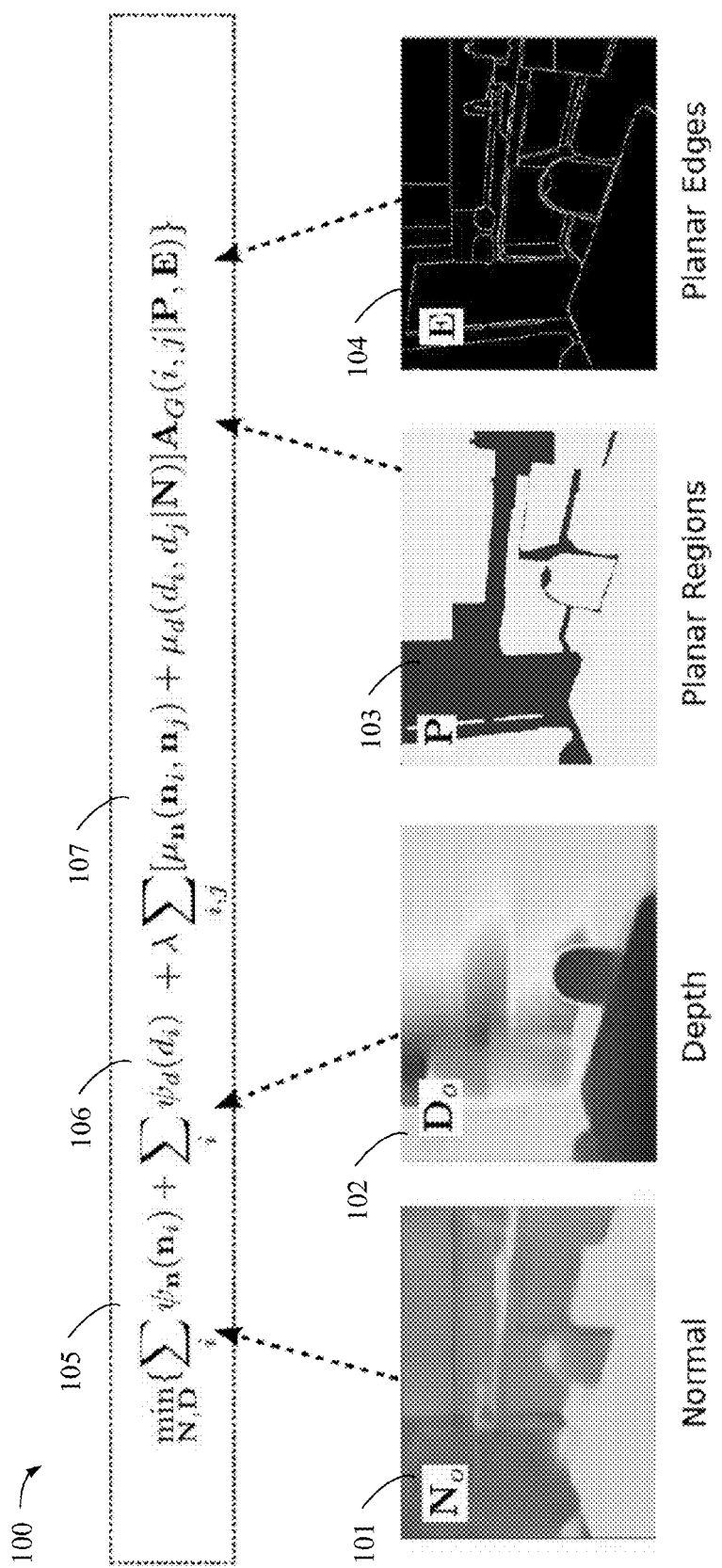
FIG. 10 is a block diagram illustrating use of normals, depths, planarity, and edge strength in a DCRF.
Figure 11:
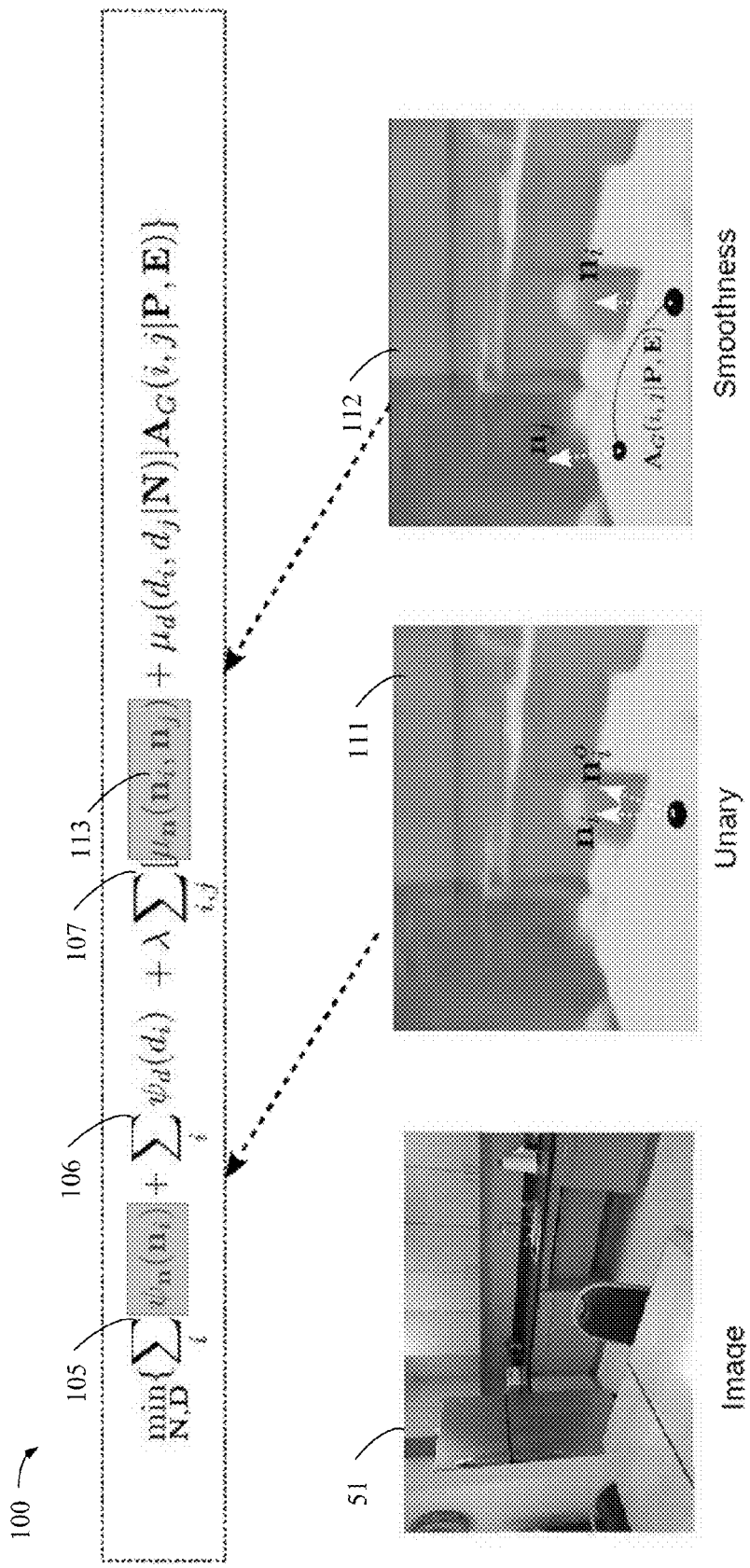
FIG. 11 is a block diagram illustrating how a unary term of the DCRF of FIG. 10 assesses deviations of normal estimates and assesses irregularity of normals of pixels in planar regions.
Figure 12:
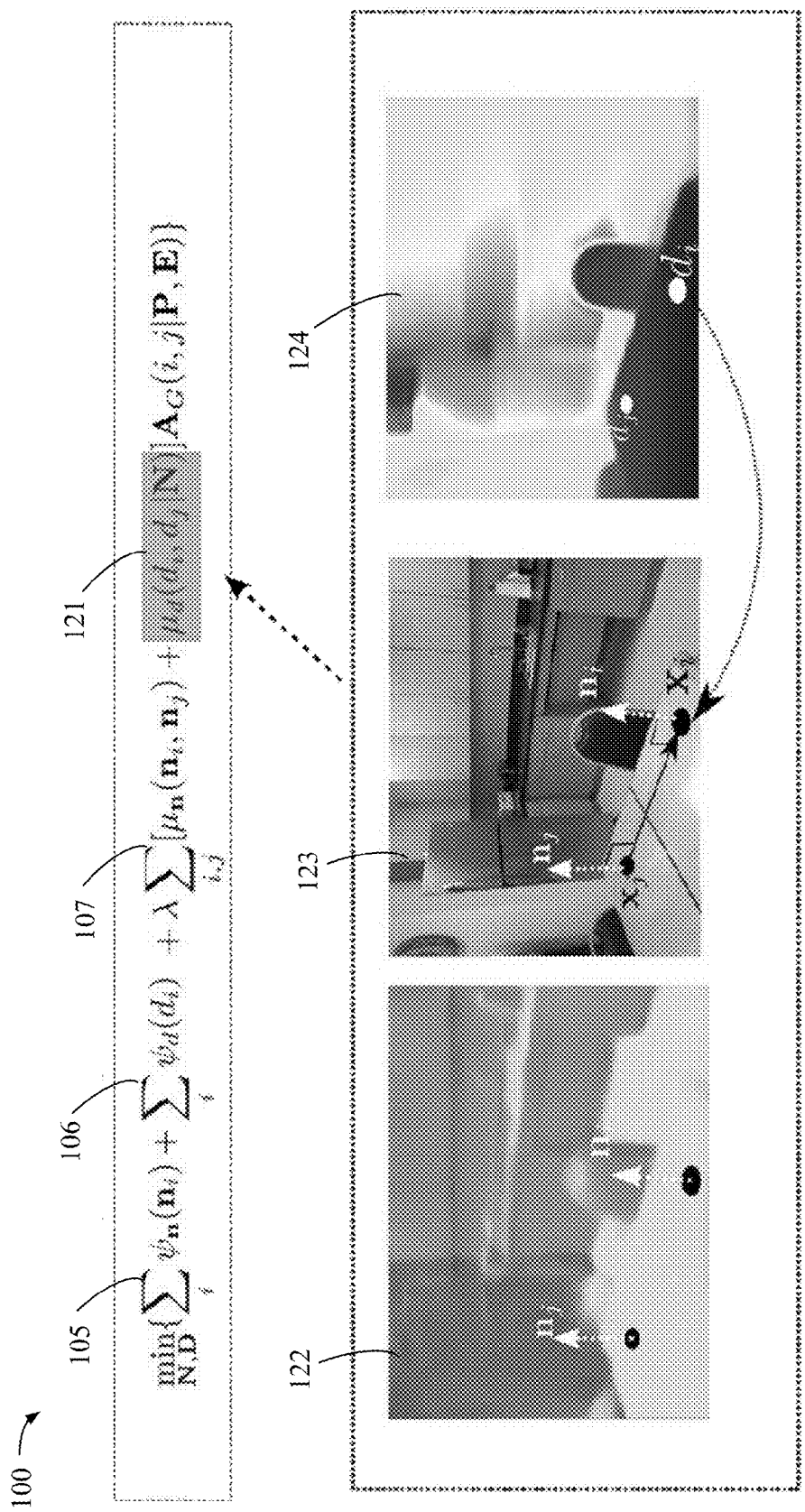
FIG. 12 is a block diagram illustrating how an orthogonal compatibility constraint in the DCRF of FIG. 10 assesses irregularity using both normals and depths in a planar region.

FIGS. 10-12 are block diagrams illustrating use of normals, depths, planarity, and edge strength in a DCRF. The minimization 100 that is depicted is an example implementation of equation 1, above. FIG. 10 illustrates how the minimization 100 that is used to identify estimates for normals and depths takes into account original estimates of normals shown in depiction 101, original estimates of depths shown in depiction 102, estimates of planarity 101, and estimates of planar edges 104. The minimization 100 attempts to find a normal and depth combination for the pixels of the image that minimizes the summations 105, 106, and 107. The result is a selection of estimates of a depth and normal of each pixel of the image based on a minimization that encourages similarity to original estimates and that minimizes irregularities within planar regions.

FIG. 11 is a block diagram illustrating how a unary term of the DCRF of FIG. 10 assesses deviations of normal estimates and assesses irregularity of normals of pixels in a plane. In this example, the first summation term 105 penalizes deviations from the original normals based on confidence values in the original normals. This is illustrated in depiction 11, which shows how an estimated normal estimate $n_i$ differs from an original normal estimate $n_i(o)$. The second summation term 106 similarly penalizes deviations of the depth estimates from the original depth estimates. FIG. 11 further illustrates how a first portion 108 of the third summation 107 of the minimization 100 ensures smooth (i.e., consistent normals) within planar regions by summing up differences between the normal of pixels within planar regions. This is illustrated in depiction 112, which shows a comparison of the normals of two pixels within a common planar region.

FIG. 12 is a block diagram illustrating how an orthogonal compatibility constraint in the DCRF of FIG. 10 assesses irregularity using both normals and depths in a planar region. In particular, the second portion 121 of the third summation 107 of the minimization 100 ensures orthogonal compatibility. In principle, when two pixels are in the same planar region, the vector connecting their corresponding 3D world coordinates should be perpendicular to their normal directions, as illustrated in depiction 122. The orthogonality compatibility is accomplished by comparing the normal of the points with a vector connecting the points as shown in block 123. This vector is determined based on the depth values of the two points illustrated in depiction 124. The orthogonal compatibility enforced by the second portion 121 of the summation 107 penalizes a vector connecting two points in a plane for deviating from perpendicular to the normal of the points. Formally, this orthogonality constraint can be formulated as, $$\mu_d(d_i, d_j, n_i, n_j) = \frac{1}{2}(n_i \cdot (x_i - x_j))^2 + \frac{1}{2}(n_j \cdot (x_i - x_j))^2, \quad (4)$$
$$\text{with } x_i = d_i K^{-1} p_i.$$

Here $x_i$ is the 3D world coordinate back projected by 2D pixel coordinate $p_i$ (written in homogeneous coordinates), given the camera calibration matrix K and depth value $d_i$. This compatibility encourages consistency between depths and normals.

Figure 13:
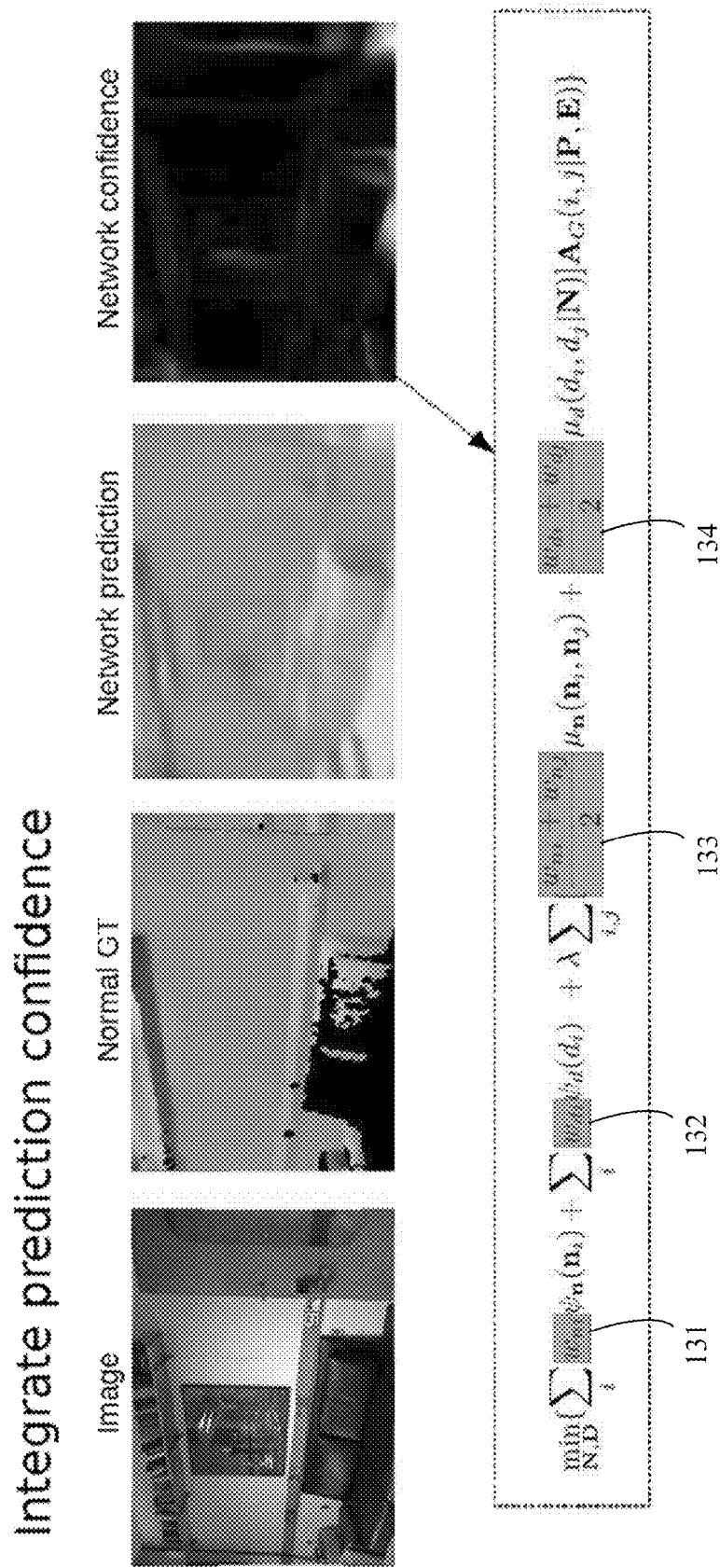
FIG. 13 is a block diagram illustrating how network confidence can be used in a DCRF.

FIG. 13 is a block diagram illustrating how network confidence can be used in a DCRF. As described above, confidence in original estimates of normal and depths can be incorporated into model to allow relatively more deviation from original estimates of normals and depths of pixels where the original estimates involved less certainty but allow relatively less deviation from the original estimates of normals and depths where the original estimates involved more certainty.

Pairwise Term for Regularization.

Techniques of the invention define the regularization term of equation 1, which can be used as the third term 107 in FIGS. 1-12, as, $$\psi_r(n_i, n_j, d_i, d_j | P_o, E_o) = \quad (3)$$
$$(\omega_{i,j}^n \mu_n(n_i, n_j) + \omega_{i,j}^d \mu_d(d_i, d_j, n_i, n_j)) A_{i,j}(P_o, E_o),$$
$$\text{where, } \omega_{i,j}^n = \frac{1}{2}(\omega_i^n + \omega_j^n), \omega_{i,j}^d = \frac{1}{2}(\omega_i^d + \omega_j^d)$$

Here, $A_{i,j}$ is a pairwise planar affinity indicating whether pixel locations i and j belong to the same planar surface derived from the inferred edge and planarity surface maps. $\mu_n(\ )$ and $\mu_d(\ )$ regularize the output surface normals and depths to be aligned inside the underlying 3D plane. Here, simplified notations are used, i.e. $\mu_n(\ )$ and $\mu_d(\ )$ for the corresponding terms.

For the compatibility $\mu_n(\ )$ of surface normals, the same function is used as $\psi_n(\ )$ in Eqn. (2), which measures the cosine distance between $n_i$ and $n_j$. For depths, an orthogonal compatibility function $\mu_d()$ which encourages the normals and depths of each pixel pair to be consistent and aligned within a 3D planar surface.

Pairwise Planar Affinity.

Figure 14:
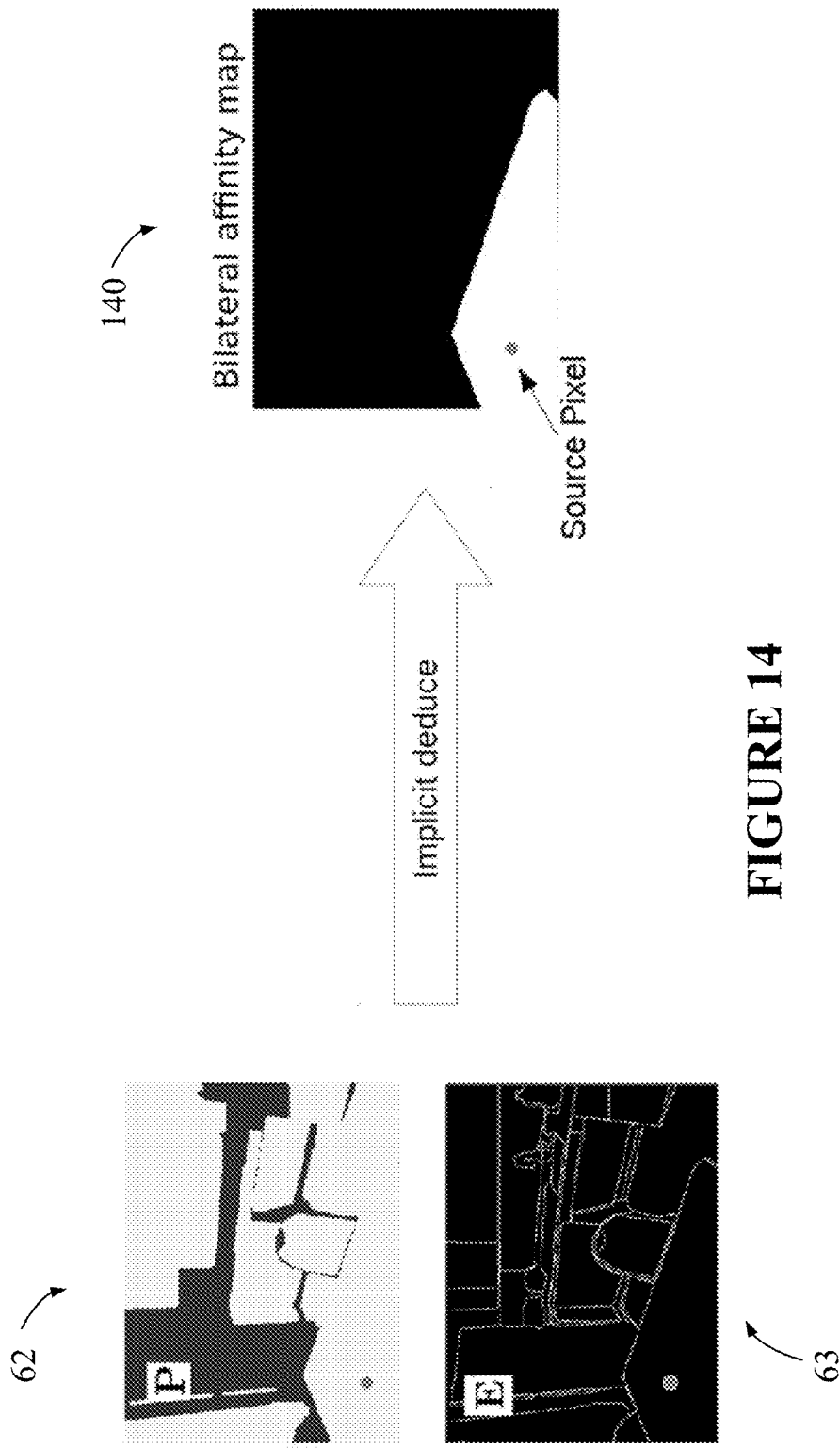
FIG. 14 is a block diagram illustrating bilateral affinity.

FIG. 14 is a block diagram illustrating bilateral affinity. FIG. 14 illustrates how planarity information shown in depiction 62 and edge strength information shown in depiction 63 are used to create bilateral affinity map 140 that partitions planar areas from the planarity depiction 51 into different planar region instances. Given a source pixel, the pixels within the same planar surface having high affinity with that pixel are identified, as shown in bilateral affinity map 140, where white indicates higher affinity and black indicates lower affinity.

As noted in Eqn. (3), the planar region affinity is used to determine whether pixels i and j belong to the same planar surface from the information of planarity and edge strength. Here $P_o$ helps to check whether two pixels are both inside planar regions, and $E_o$ helps to determine whether the two pixels belong to the same planar region. In this example, a Gaussian bilateral affinity is used to represent such information. Specifically, planar region affinity is defined as, $$A_{i,j}(P_o, E_o) = p_i p_j (\omega_1 \kappa(f_i, f_j; \theta_\alpha) \kappa(c_i, c_j; \theta_\beta) + \omega_2 \kappa(c_i, c_j; \theta_\gamma)), \quad (5)$$

where $$\kappa(z_i, z_j; \theta) = \exp\left(-\frac{1}{2\theta^2} \|z_i - z_j\|^2\right)$$

is a Gaussian RBF kernel. $p_i$ is the predicted value from the planar map $P_o$ at pixel i. $p_i p_j$ indicates that the regularization is activated when both i, j are inside planar regions with high probability. $f_i$ is the appearance feature derived from the edge map $E_o$, $c_i$ is the 2D coordinate of pixel i on image. $\omega_1$, $\omega_2$, $\theta_\alpha$, $\theta_\beta$, $\theta_\gamma$ are parameters.

To transform the pairwise similarity derived from the edge map to the feature representation f for efficient computing, an affinity matrix between pixels is first generated. The affinity map is generated, for example, using intervening contour and normalized cut techniques. An appropriate number of dimensions is selected. In one technique of the invention, the top 6 dimensions from the resultant Eigen vectors are selected as feature f for each pixel.

Figure 15:
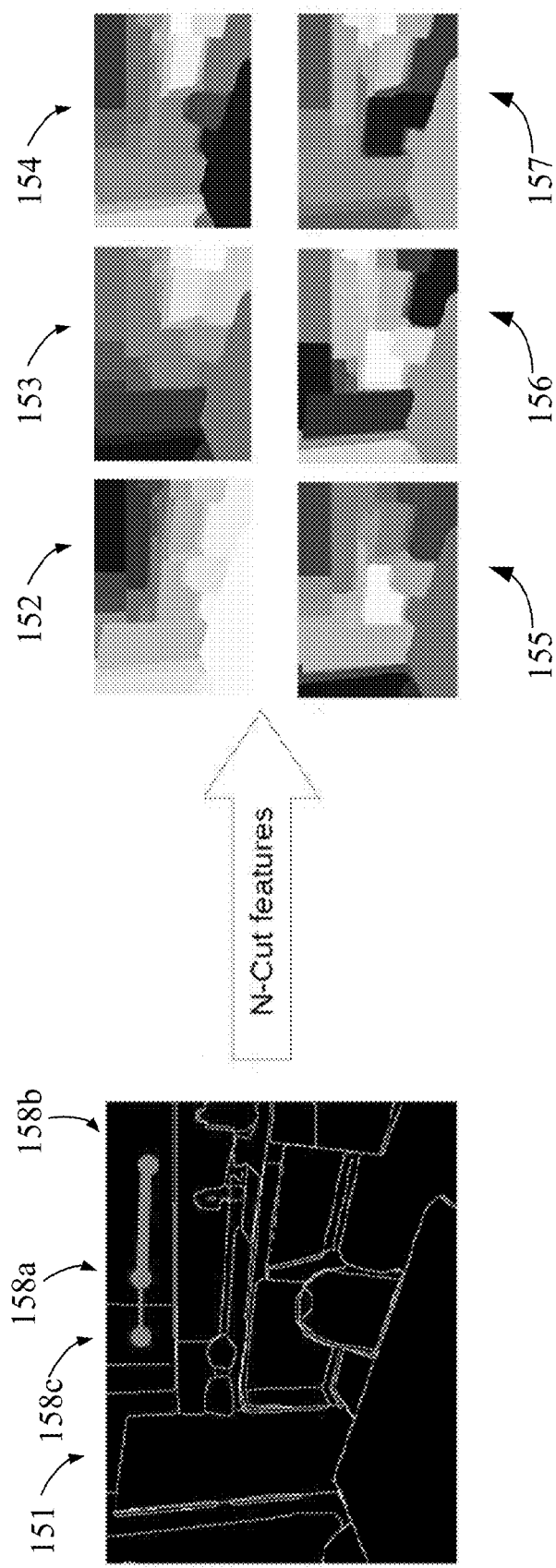
FIG. 15 is a block diagram illustrating selection of the top Eigen vectors as the feature f for each pixel of an image based on an affinity map.

FIG. 15 illustrates selection of the top 6 Eigen vectors as the feature f for each pixel based on an affinity map. Depiction 151 shows an edge map that identifies estimates of which pixels of the image are edges. The affinity matrix is based on edge information, such as the edge information in depiction 151. Depiction 151 illustrates an example of pixels 158a and 158b that will have high affinity with one another in the affinity matrix because there is no intervening edge between the pixels 158a and 158b. In contrast, depiction 151, illustrates an example of pixels 158a and 158c that will have low affinity with one another in the affinity matrix because there is an intervening edge between the pixels 158a and 158b. The affinity matrix includes values for every pair of pixels based on the edge strength information. Affinity between pixels is low when crossing an edge between the pixels. Affinity between two pixels is high when not crossing an edge between the pixels.

The affinity matrix is used to create a feature f to put the affinity information identifying how pixels relate to one another with respect to intervening edges into a more useable form to allow comparison of the individual pixels with one another to determine if the pixels are likely to be in a common planar region. A single value decomposition of the affinity matrix is performed to provide the top 6 eigenvalues which provide the values that can be used to compare pixels to determine the likelihood that pixels are in a common planar region. Each eigenvalue has an eigenvector corresponding to it and is reshaped to the width and height of the image for illustration purposes. The six reshaped eigenvectors are graphically illustrated in depictions 152-157.

The feature f provides six values for each pixel, with one value represented by the shading of the pixel in each of the depictions 152-157. Thus, in a specific example, a first pixel may have values (1, 4, 20, 50, 3, 5) and a second pixel may have values (1, 4, 20, 50, 4, 5). The similarity of the values is used to determine that these pixels are likely in a common planar region. The depictions 152-157 are provided to illustrate how planar regions of the image such as the table top, will have similar values (represented by the similar shading in the depictions 152-157) but that pixels that are not within common planar regions will have dissimilar values (and thus dissimilar shading in the depictions 152-157). This can be observed by comparing two pixels and each of the six depictions 152-157 and noting the similar or different shading of the pixels in the various images. Computationally, such a comparison is performed by computer comparing the six values of one pixel with the six values of the other pixel.

Inference.

To optimize the objective function defined in Eqn. (1), a mean-field approximation for fast inference can be used. In addition, coordinate descent can be used to sequentially optimize normals and depths. When optimizing normals, for simplicity and efficiency, the term of $\mu_d()$ in Eqn. (3) is not considered, yielding the updating for pixel i at iteration t as, $$n_i^{(t)} \leftarrow \frac{1}{2} \omega_i^n n_i^o + \frac{\lambda}{2} \sum_{j, j \neq i} \omega_j^n n_j^{(t-1)} A_{i,j}, \; n_i^{(t)} \leftarrow n_i^{(t)} / \|n_i^{(t)}\|_2, \quad (6)$$

which is equivalent to first performing a dense bilateral filtering with the pairwise planar affinity term $A_{i,j}$ for the predicted normal map, and then applying L2 normalization.

Given the optimized normal information, optimized depth values can be further optimized. Similar to normals, after performing mean-field approximation, the inferred updating equation for depth at iteration t is, $$d_i^{(t)} \leftarrow \frac{1}{v_i} \left( \omega_i^d d_i^o + \lambda (n_i \cdot p_i) \sum_{j, j \neq i} A_{i,j} \omega_j^d d_j^{(t-1)} (n_j \cdot p_j) \right) \quad (7)$$

Since the graph is densely connected, only a few (<10) iterations are needed to achieve reasonable performance. Experiments suggest that 5 iterations for normal inference and 2 iterations for depth inference yield reasonable results.

Joint Training of CNN and DCRF.

The DCRF inference can be implemented as a trainable layer by considering the inference as a feedforward process, to enable joint training together with the normal and depth neural networks. This allows back-propagation of the planar region information to the neural networks and further refines their outputs.

The following example relates to back-propagation to the normal network. Suppose the gradient of normal passed from the upper layer after DCRF for pixel i is $\nabla_f(n_i)$, which is a 3×1 vector. It is back-propagated through the L2 normalization using the equation of $\nabla_{L2}(n_i)=I/\|n_i\|-n_i n_i^T/\|n_i\|^3)\nabla_f(n_i)$, and then back-propagated through the mean-field approximation in Eqn. (6) as, $$\frac{\partial L(N)}{\partial n_i} = \frac{\nabla_{L2}(n_i)}{2} + \frac{\lambda}{2}\sum_{j,j\neq i} A_{j,i}\nabla_{L2}(n_j), \quad (8)$$

where L(N) is the loss from normal predictions after DCRF and I is the identity matrix.

The following example relates to back-propagation to the depth network. For depth, suppose the gradient from the upper layer is $\nabla_f(d_i)$, the depth gradient for back-propagation through Eqn. 7 can be inferred as, $$\frac{\partial L(D)}{\partial d_i} = \frac{1}{v_i}\nabla_f(d_i) + \lambda(n_i \cdot p_i)\sum_{j,j\neq i}\frac{1}{v_j}A_{j,i}(n_j, p_j)\nabla_f(d_j) \quad (9)$$

where L(D) is the loss from depth predictions after DCRF.

Note that during back propagation for both surface normals and depths, the confidences were dropped since they are not used during training and are only used for testing. It is possible to also back propagate the gradients of the depth values to the normal network via the surface normal and depth compatibility in Eqn. (4). However, this involves the depth values from all the pixels within the same plane, which may be intractable and cause difficulty during joint learning.

Implementation Details for DCRF.

In some techniques of the invention, normals and depths are estimated by building on the implementation from Eigen and Fergus described in D. Eigen and R. Fergus. Predicting depth, surface normals and semantic labels with a common multi-scale convolutional architecture, In ICCV, 2015. In some techniques of the invention, prediction confidences for the surface normals and depths are computed using Monte Carlo dropout described in N. Srivastava, G. Hinton, A. Krizhevsky, I. Sutskever, and R. Salakhutdinov. Dropout: A simple way to prevent neural networks from overfitting, The Journal of Machine Learning Research, 15(1), 2014. Specifically, one example forward propagates through the network 10 times with dropout during testing, and computes the prediction variance $v_i$ at each pixel. The predictions with larger variance $v_i$ are considered less stable, so the confidence is set as $\omega_i'=\exp(-v_i/\sigma^{-2})$. One example empirically sets $\sigma_n=0:1$ for normals prediction and $\sigma_d=0:15$ for depth prediction to produce reasonable confidence values.

In some techniques of the invention, for prediction of the plane map $P_o$, a semantic segmentation network structure is adopted that is similar to the Deeplab network, as described in L. Chen, G. Papandreou, I. Kokkinos, K. Murphy, and A. L. Yuille, Semantic image segmentation with deep convolutional nets and fully connected crfs, ICLR, 2015, but with multi-scale output as the FCN, described in J. Long, E. Shelhamer, and T. Darrell, Fully convolutional networks for semantic segmentation, In CVPR, pages 3431-3440, 2015. The training is formulated as a pixel-wise two-class classification problem (planar vs. non-planar). The output of the network is hereby a plane probability map $P_o$ where $p_i$ at pixel i indicates the probability of pixel i belonging to a planar surface. The edge map $E_o$ indicates the plane boundaries. During training, the ground-truth edges are extracted from the corresponding ground-truth depth and normal maps, and refined by semantic annotations when available. In some techniques of the invention, the Holistic-nested Edge Detector (HED) network as described in S. Xie and Z. Tu, Holistically-nested edge detection, ICCV, 2015 is adopted for training. In addition, the network is augmented by adding predicted depth and normal maps as another 4-channel input to improve recall, which is significant for regularization since missing edges could mistakenly merge two planes and propagate errors during the message passing.

For the surface bilateral filter in Eqn. (5), the parameters are set $\theta_\alpha=0.1$, $\theta_\beta=50$, $\theta_\gamma=2$, $\omega_1=1$, $\omega_2=0.3$ and $\lambda=2$ is set in Eqn. (1) through a grid search over a validation set. The four types of inputs to the DCRF are aligned and resized to 294×218. During the joint training of DCRF and CNNs, the network is fine tuned based on the weights pre-trained as described in D. Eigen and R. Fergus, Predicting depth, surface normals and semantic labels with a common multi-scale convolutional architecture, In ICCV, 2015, with the training images, and the same loss functions and learning rates can be used as in the depth and normal networks respectively described therein.

Exemplary Computing Environment

Figure 16:
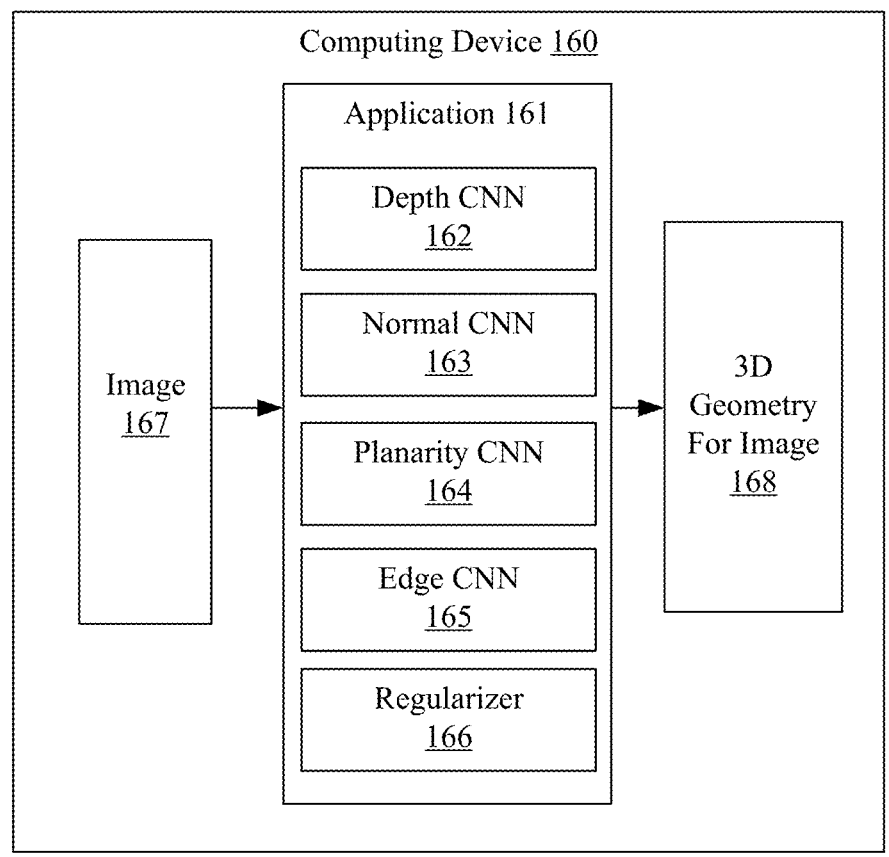
FIG. 16 is a block diagram illustrates an exemplary computing device having an application for enhancing an image with planar-region-guided estimates of 3D geometry of objects depicted in the image.

FIG. 16 illustrates an exemplary computing device 160 that includes an application 161. The application 161 includes functionality for accessing or performing various functions. In this example, the application 161 includes a depth CNN feature 162 for estimating depths of pixels of an image 167, a normal CNN feature 163 for estimating normals of pixels of the image 167, a planarity CNN feature 164 for estimating planarity of pixels of the image 167, and an edge CNN feature 165 for estimating edge strength of pixels of the image 167. The regularizer 166 uses the estimates from the four CNN features 162, 163, 164, 165 to produce a 3D geometry for the image 168 that includes regularized depths and normals in planar regions of image 167. For example, the regularizer 166 can identify planar regions as illustrated in FIG. 5 and described in various examples herein. Similarly, the regularizer 166 can use identified planar regions to provide the technique illustrated in FIG. 9 and other 3D geometry estimation techniques described herein. The regularizer 166 can implement an minimization such as the minimization of equation 1 or the minimizations depicted in FIGS. 10-13 and described elsewhere herein.

Figure 17:
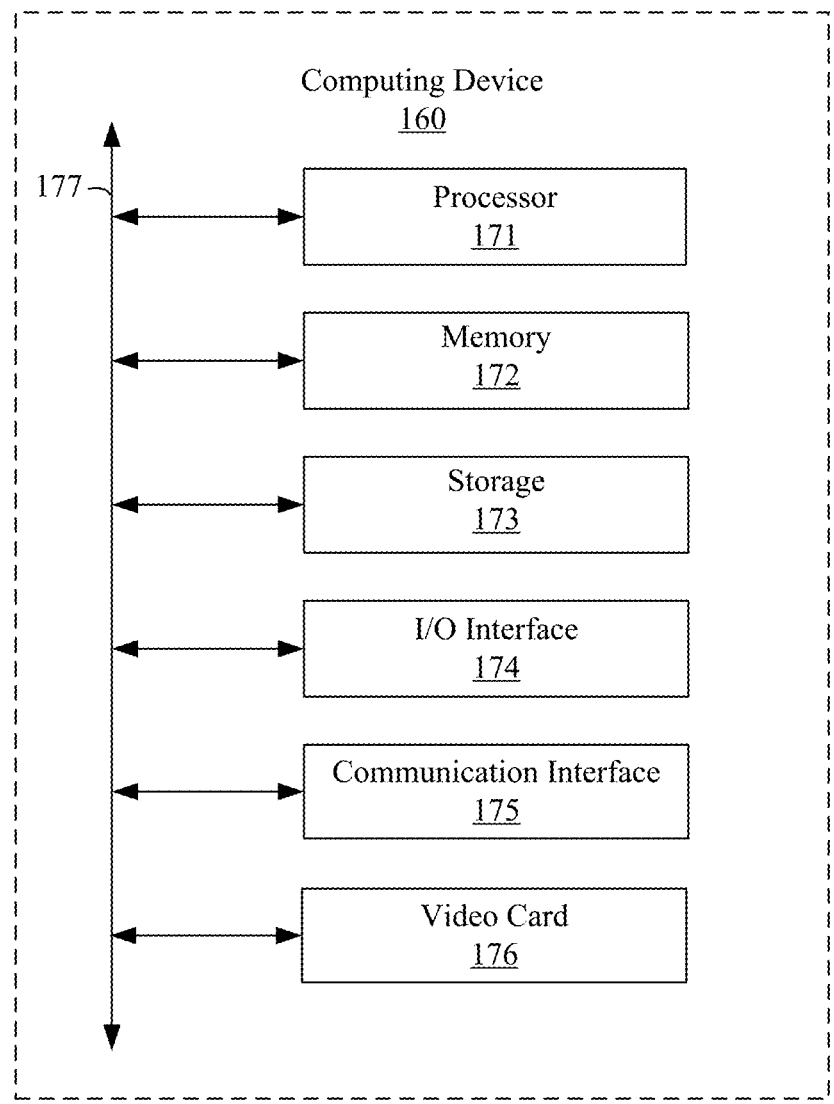
FIG. 17 is a block diagram depicting an example hardware implementation of the computing device of FIG. 16.

Any suitable computing system or group of computing systems can be used to implement the techniques and methods disclosed herein. For example, FIG. 17 is a block diagram depicting examples of implementations of such components. The computing device 160 can include a processor 171 that is communicatively coupled to a memory 172 and that executes computer-executable program code and/or accesses information stored in memory 172 or storage 173. The processor 171 may comprise a microprocessor, an application-specific integrated circuit ("ASIC"), a state machine, or other processing device. The processor 171 can include one processing device or more than one processing device. Such a processor can include or may be in communication with a computer-readable medium storing instructions that, when executed by the processor 171, cause the processor to perform the operations described herein.

The memory 172 and storage 173 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 160 may also comprise a number of external or internal devices such as input or output devices. For example, the computing device is shown with an input/output ("I/O") interface 174 that can receive input from input devices or provide output to output devices. A communication interface 175 may also be included in the computing device 160 and can include any device or group of devices suitable for establishing a wired or wireless data connection to one or more data networks. Non-limiting examples of the communication interface 175 include an Ethernet network adapter, a modem, and/or the like. The computing device 160 can transmit messages as electronic or optical signals via the communication interface 175. The computing device 170 uses a video card 176 to provide hardware-accelerated graphics processing. A bus 177 can also be included to communicatively couple one or more components of the computing device 160.

The computing device 160 can execute program code that configures the processor 171 to perform one or more of the operations described above. The program code can include one or more modules. The program code may be resident in the memory 172, storage 173, or any suitable computer-readable medium and may be executed by the processor 171 or any other suitable processor. In some techniques, modules can be resident in the memory 172. In additional or alternative techniques, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more techniques of the present subject matter. Any suitable programming, scripting, or other type of language or combinations of languages may be used to implement the teachings contained herein in software to be used in programming or configuring a computing device.

Techniques of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific techniques thereof, it will be appreciated that those skilled in the art, upon attaining an understanding of the foregoing, may readily produce alterations to, variations of, and equivalents to such techniques. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for enhancing an image based on planar-region-guided estimates of 3D geometry of objects depicted in the image, the method comprising:
   determining planarity and edge strength of pixels of the image, wherein the determining of planarity and edge strength of the pixels of the image is based on the image of the objects and is not based on additional images of the objects;
   determining whether pixels of the image are within common planar regions based on the determining of planarity and edge strength of the pixels of the image;
   determining 3D geometry values of pixels in the common planar regions based on a planar region constraint that requires a relationship between the 3D geometry values of pixels within common planar regions; and
   enhancing the image by using the 3D geometry values of the pixels to provide the 3D geometry of the objects in the image.

2. The method of claim 1, wherein determining the 3D geometry values of the pixels in common planar regions comprises selecting normals of the pixels of the image based on the planar region constraint requiring similar normals of pixels in common planar regions.

3. The method of claim 1, wherein determining the 3D geometry values of the pixels in common planar regions comprises selecting depths of the pixels of the image based on the planar region constraint requiring that depths of pixels in common planar regions translate to pixel 3D positions consistent with planar expectations.

4. The method of claim 1, wherein determining the 3D geometry values of the pixels in common planar regions comprises:
   selecting normals of the pixels of the image based on the planar region constraint requiring similar normals of pixels in common planar regions; and
   selecting depths of the pixels of the image based on the planar region constraint requiring that depths of pixels in common planar regions translate to pixel 3D positions consistent with planar expectations.

5. The method of claim 1, wherein determining the 3D geometry values of the pixels in common planar regions comprises selecting depths and normals of the pixels of the image based on the planar region constraint requiring that a vector connecting 3D pixel positions of a pair of pixels in a common planar region be perpendicular to a normal of a pixel of the pair of pixels.

6. The method of claim 1, wherein determining the 3D geometry values of the pixels in common planar regions comprises:
receiving original estimates of normals and depths of the pixels of the image;
selecting normals and depths as the 3D geometry values of the pixels by employing an objective function, wherein employing the objective function comprises penalizing deviations from the original estimates of depths and normals and penalizing planar region irregularities based on deviations from the planar region constraint.

7. The method of claim 6, wherein employing the objective function comprises assigning a relatively smaller penalty to deviations from less confident original estimates of depths and normals.

8. The method of claim 6 further comprising training deep convolutional neural networks (CNNs) using training data and applying the deep CNNs to the image to identify the original estimates of the normals of the pixels, the original estimates of the depths of the pixels, the planarity of the pixels, and the edge strength of the pixels.

9. The method of claim 1, wherein determining the 3D geometry values of the pixels in common planar regions comprises applying the planar region constraint based on distance between pixels.

10. The method of claim 1, wherein determining whether pixels of the image are within common planar regions comprises:
deriving a feature vector of the pixels of the image based on the determining of planarity and edge strength of the pixels of the image, wherein deriving the feature vector comprises determining features of pixels of the image; and
comparing the features of pixels of the image to determine whether pixels of the image are within common planar regions.

11. The method of claim 10, wherein comparing the features of pixels of the image comprises comparing the features of non-local pixels without constraint to spatial proximity of the non-local pixels in the image.

12. The method of claim 1, wherein determining whether pixels of the image are within common planar regions comprises computing values representing likelihoods that pixels are within common planar regions.

13. A method, performed by a computing device, for enhancing an image with planar-region-guided estimates of 3D geometry of objects depicted in the image, the method comprising:
determining normals, depths, planarity, and edge strength of pixels of the image;
determining whether pixels of the image are within common planar regions based on the planarity and edge strength of the pixels;
adjusting the normals and depths of the pixels by employing an objective function to minimize planar region irregularities, wherein employing the objective function comprises penalizing adjustments to the normals and depths based on amount of adjustment and penalizing deviations from a planar region constraint that requires a relationship between the normals or depths of pixels within common planar regions; and
enhancing the image by using the normals and depths of the pixels to provide the 3D geometry of the objects in the image.

14. The method of claim 13, wherein penalizing adjustments to the normals and depths based on amount of adjustment comprises penalizing the adjustments based on confidence in the normals and depths.

15. The method of claim 13, wherein determining normals, depths, planarity, and edge strength of pixels of the image comprises using deep convolutional neural networks (CNNs).

16. The method of claim 13, wherein determining whether pixels of the image are within common planar regions comprises:
deriving a feature vector of the pixels of the image based on the determining of planarity and edge strength of the pixels of the image, wherein deriving the feature vector comprises determining features of pixels of the image; and
comparing the features of pixels of the image to determine whether pixels of the image are within common planar regions.

17. The method of claim 16, wherein determining whether pixels of the image are within common planar regions comprises computing values representing likelihoods that pixels are within common planar regions.

18. A method, performed by a computing device, for enhancing an image with planar-region-guided estimates of 3D geometry of objects depicted in the image, the method comprising:
computing values representing likelihoods that pixels of the image are within common planar regions; and
determining 3D geometry values of pixels based on applying a planar region constraint that requires a relationship between the 3D geometry values of pixels within common planar regions, wherein applying the planar region constraint uses the values representing likelihoods that pixels of the image are within common planar regions; and
enhancing the image by using the 3D geometry values of the pixels to provide the 3D geometry of the objects in the image.

19. The method of claim 18, wherein determining the 3D geometry values of the pixels in common planar regions comprises:
selecting normals of the pixels of the image based on the planar region constraint requiring similar normals of pixels in common planar regions; and
selecting depths of the pixels of the image based on the planar region constraint requiring that depths of pixels in common planar regions translate to pixel 3D positions consistent with planar expectations.

20. The method of claim 18, wherein computing the values representing likelihoods that pixels are within common planar regions comprises:
deriving a feature vector of the pixels of the image based on the determining of planarity and edge strength of the pixels of the image, wherein deriving the feature vector comprises determining features of pixels of the image; and comparing the features of pixels of the image to compute the values representing likelihoods that pixels are within common planar regions.

* * * * *